US012626371B2

(12) United States Patent
Singh et al.

(10) Patent No.:  US 12,626,371 B2
(45) Date of Patent:       May 12, 2026

(54) GENERATING IMAGE OBJECT SEGMENTATIONS UTILIZING GRAPH-CUT PARTITIONING IN SELF-SUPERVISED OBJECT DISCOVERY

(71) Applicant: Adobe Inc., San Jose, CA (US)

(72) Inventors: Silky Singh, Bisrakh Jalalpur (IN); Shripad Vilasrao Deshmukh, Solapur (IN); Mausoom Sarkar, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 322 days.

(21) Appl. No.: 18/478,093

(22) Filed: Sep. 29, 2023

(65) Prior Publication Data

US 2025/0111520 A1     Apr. 3, 2025

(51) Int. Cl.
*G06T 7/194*          (2017.01)
*G06N 3/0895*        (2023.01)
(Continued)

(52) U.S. Cl.
CPC ........... *G06T 7/194* (2017.01); *G06N 3/0895* (2023.01); *G06T 7/11* (2017.01); *G06T 7/162* (2017.01);
(Continued)

(58) Field of Classification Search
CPC ........... G06T 7/162; G06T 2207/20072; G06T 7/10–11; G06T 7/194; G06T 7/174; G06T 2207/20081; G06T 2207/20084; G06T 2207/10016; G06T 7/20; G06T 7/215; G06T 7/223–251; G06T 2207/20076;
(Continued)

(56) References Cited

U.S. PATENT DOCUMENTS

2024/0169545 A1 *   5/2024   Lan ...................... G06N 3/0455

OTHER PUBLICATIONS

Wang, Yangtao, et al. "TokenCut: Segmenting Objects in Images and Videos with Self-supervised Transformer and Normalized Cut." arXiv preprint arXiv:2209.00383v2 (2022). (Year: 2022).*
(Continued)

*Primary Examiner* — Geoffrey E Summers
(74) *Attorney, Agent, or Firm* — Keller Preece PLLC

(57)                    ABSTRACT
The present disclosure is directed toward systems, methods, and non-transitory computer readable media that provide self-supervised object discovery systems that combine motion and appearance information to generate segmentation masks from a digital image or digital video and delineate one or more salient objects within the digital image/digital video. The disclosed systems utilize a neural network encoder to generate a fully connected graph based on image patches from the digital input, incorporating image patch feature and optical flow patch feature similarities to produce edge weights. The disclosed systems partition the generated graph to produce a segmentation mask. Furthermore, the disclosed systems iteratively train a segmentation network based on the segmentation mask as a pseudo-ground truth via a bootstrapped, self-training process. By utilizing both motion and appearance information to generate a bi-partitioned graph, the disclosed systems produce high-quality object segmentation masks that represent a foreground and background of digital inputs.

20 Claims, 11 Drawing Sheets

(51) Int. Cl.
| | |
|---|---|
| *G06T 7/11* | (2017.01) |
| *G06T 7/162* | (2017.01) |
| *G06T 7/215* | (2017.01) |
| *G06T 7/246* | (2017.01) |

(52) U.S. Cl.
CPC .............. *G06T 7/215* (2017.01); *G06T 7/248* (2017.01); *G06T 2207/20072* (2013.01); *G06T 2207/20076* (2013.01); *G06T 2207/20081* (2013.01); *G06T 2207/20084* (2013.01)

(58) Field of Classification Search
CPC ........ G06N 3/08; G06N 3/0895; G06N 3/045; G06N 3/0455
See application file for complete search history.

(56) References Cited

OTHER PUBLICATIONS

Wang, Xudong, et al. "Cut and Learn for Unsupervised Object Detection and Instance Segmentation." arXiv preprint arXiv: 2301.11320v1 (2023). (Year: 2023).*

Croitoru, Ioana, Simion-Vlad Bogolin, and Marius Leordeanu. "Unsupervised learning of foreground object segmentation." International Journal of Computer Vision 127.9 (2019): 1279-1302. (Year: 2019).*

Hong, Seunghoon, et al. "Learning Transferrable Knowledge for Semantic Segmentation with Deep Convolutional Neural Network." 2016 IEEE Conference on Computer Vision and Pattern Recognition (CVPR). IEEE, 2016. (Year: 2016).*

Adam Bielski and Paolo Favaro. Emergence of object segmentation in perturbed generative models. Advances in Neural Information Processing Systems, 32, 2019.

Allan Jepson and Michael J Black. Mixture models for optical flow computation. In Proceedings of IEEE Conference on Computer Vision and Pattern Recognition, pp. 760-761. IEEE, 1993.

Alon Faktor and Michal Irani. Video segmentation by non-local consensus voting. In BMVC, vol. 2, p. 8, 2014.

Amy Bearman, Olga Russakovsky, Vittorio Ferrari, and Li Fei-Fei. What's the point: Semantic segmentation with point supervision. In Computer Vision-ECCV 2016: 14th European Conference, Amsterdam, The Netherlands, Oct. 11-14, 2016, Proceed-ings, Part VII 14, pp. 549-565. Springer, 2016.

Andrey Voynov, Stanislav Morozov, and Artem Babenko. Object segmentation without labels with large-scale generative models. In International Conference on Machine Learning, pp. 10596-10606. PMLR, 2021.

Andrii Zadaianchuk, Matthaeus Kleindessner, Yi Zhu, Francesco Locatello, and Thomas Brox. Unsupervised semantic segmentation with self-supervised object-centric representations. arXiv preprint arXiv:2207.05027, 2022.

Anestis Papazoglou and Vittorio Ferrari. Fast object segmentation in unconstrained video. In Proceedings of the IEEE international conference on computer vision, pp. 1777-1784, 2013.

Aravindh Mahendran, James Thewlis, and Andrea Vedaldi. Self-supervised segmentation by grouping optical-flow. In Proceedings of the European Conference on Computer Vision (ECCV) Workshops, 2018.

Bowen Cheng, Alex Schwing, and Alexander Kirillov. Per-pixel classification is not all you need for semantic segmentation. Advances in Neural Information Processing Systems, 34:17864-17875, 2021.

Catherine Wah, Steve Branson, Peter Welinder, Pietro Perona, and Serge Belongie. The caltech-ucsd birds-200-2011 dataset. 2011.

Charig Yang, Hala Lamdouar, Erika Lu, Andrew Zisserman, and Weidi Xie. Self-supervised video object segmentation by motion grouping. In Proceedings of the IEEE/CVF International Conference on Computer Vision, pp. 7177-7188, 2021.

Chuan Yang, Lihe Zhang, Huchuan Lu, Xiang Ruan, and Ming-Hsuan Yang. Saliency detection via graph-based manifold ranking.

In Proceedings of the IEEE conference on computer vision and pattern recognition, pp. 3166-3173, 2013.

Deepak Pathak, Philipp Krahenbuhl, and Trevor Darrell. Constrained convolutional neural networks for weakly supervised segmentation. In Proceedings of the IEEE international conference on computer vision, pp. 1796-1804, 2015.

Di Lin, Jifeng Dai, Jiaya Jia, Kaiming He, and Jian Sun. Scribblesup: Scribble-supervised convolutional networks for semantic segmentation. In Proceedings of the IEEE conference on computer vision and pattern recognition, pp. 3159-3167, 2016.

Dong-Hyun Lee et al. Pseudo-label: The simple and efficient semi-supervised learning method for deep neural networks. In Workshop on challenges in representation learning, ICML, vol. 3, p. 896, 2013.

Etienne Meunier, Anaïs Badoual, and Patrick Bouthemy. Em-driven unsupervised learning for efficient motion segmentation. arXiv preprint arXiv:2201.02074, 2022.

Federico Perazzi, Jordi Pont-Tuset, Brian McWilliams, Luc Van Gool, Markus Gross, and Alexander Sorkine-Hornung. A benchmark dataset and evaluation methodology for video object segmentation. In Proceedings of the IEEE conference on computer vision and pattern recognition, pp. 724-732, 2016.

Fuxin Li, Taeyoung Kim, Ahmad Humayun, David Tsai, and James M Rehg. Video segmentation by tracking many figure-ground segments. In Proceedings of the IEEE international conference on computer vision, pp. 2192-2199, 2013.

Gene H Golub and Charles F Van Loan. Matrix computations. JHU press, 2013.

George Papandreou, Liang-Chieh Chen, Kevin P Murphy, and Alan L Yuille. Weakly- and semi-supervised learning of a deep convolutional network for semantic image segmentation. In Proceedings of the IEEE international conference on computer vision, pp. 1742-1750, 2015.

Georgy Ponimatkin, Nermin Samet, Yang Xiao, Yuming Du, Renaud Marlet, and Vincent Lepetit. A simple and powerful global optimization for unsupervised video object segmentation. In Proceedings of the IEEE/CVF Winter Conference on Applications of Computer Vision, pp. 5892-5903, 2023.

Gyungin Shin, Samuel Albanie, and Weidi Xie. Unsupervised salient object detection with spectral cluster voting. In Proceedings of the IEEE/CVF Conference on Computer Vision and Pattern Recognition, pp. 3971-3980, 2022.

Hala Lamdouar, Weidi Xie, and Andrew Zisserman. Segmenting invisible moving objects. 2021.

Haofei Xu, Jing Zhang, Jianfei Cai, Hamid Rezatofighi, and Dacheng Tao. Gmflow: Learning optical flow via global matching. In Proceedings of the IEEE/CVF conference on computer vision and pattern recognition, pp. 8121-8130, 2022.

Hugo Touvron, Matthieu Cord, Matthijs Douze, Francisco Massa, Alexandre Sablay-rolles, and Hervé Jégou. Training data-efficient image transformers & distillation through attention. In International conference on machine learning, pp. 10347-10357. PMLR, 2021.

Huy V Vo, Patrick Pérez, and Jean Ponce. Toward unsupervised, multi-object discovery in large-scale image collections. In Computer Vision-ECCV 2020: 16th European Conference, Glasgow, UK, Aug. 23-28, 2020, Proceedings, Part XXIII 16, pp. 779-795. Springer, 2020.

I Zeki Yalniz, Hervé Jégou, Kan Chen, Manohar Paluri, and Dhruv Mahajan. Billion-scale semi- supervised learning for image classification. arXiv preprint arXiv:1905.00546, 2019.

Ilya Loshchilov and Frank Hutter. Decoupled weight decay regularization. arXiv preprint arXiv:1711.05101, 2017.

Jason Chang and John W Fisher. Topology-constrained layered tracking with latent flow. In Proceedings of the IEEE International Conference on Computer Vision, pp. 161-168, 2013.

Jia Xu, Alexander G Schwing, and Raquel Urtasun. Learning to segment under various forms of weak supervision. In Proceedings of the IEEE conference on computer vision and pattern recognition, pp. 3781-3790, 2015.

Jianbo Shi and Jitendra Malik. Normalized cuts and image segmentation. IEEE Transactions on pattern analysis and machine intelligence, 22(8):888-905, 2000.

(56) References Cited

OTHER PUBLICATIONS

Jianping Shi, Qiong Yan, Li Xu, and Jiaya Jia. Hierarchical image saliency detection on extended cssd. IEEE transactions on pattern analysis and machine intelligence, 38 (4):717-729, 2015.

Jifeng Dai, Kaiming He, and Jian Sun. Boxsup: Exploiting bounding boxes to supervise convolutional networks for semantic segmentation. In Proceedings of the IEEE international conference on computer vision, pp. 1635-1643, 2015.

Jing Zhang, Tong Zhang, Yuchao Dai, Mehrtash Harandi, and Richard Hartley. Deep unsupervised saliency detection: A multiple noisy labeling perspective. In Proceedings of the IEEE conference on computer vision and pattern recognition, pp. 9029-9038, 2018.

Jonathan Long, Evan Shelhamer, and Trevor Darrell. Fully convolutional networks for semantic segmentation. In Proceedings of the IEEE conference on computer vision and pattern recognition, pp. 3431-3440, 2015.

Junnan Li, Dongxu Li, Caiming Xiong, and Steven Hoi. Blip: Bootstrapping language- image pre-training for unified vision-language understanding and generation. In International Conference on Machine Learning, pp. 12888-12900. PMLR, 2022.

Junyu Xie, Weidi Xie, and Andrew Zisserman. Segmenting moving objects via an object-centric layered representation. In Advances in Neural Information Processing Systems, 2022.

Liang Liu, Jiangning Zhang, Ruifei He, Yong Liu, Yabiao Wang, Ying Tai, Donghao Luo, Chengjie Wang, Jilin Li, and Feiyue Huang. Learning by analogy: Reliable super-vision from transformations for unsupervised optical flow estimation. In Proceedings of the IEEE/CVF conference on computer vision and pattern recognition, pp. 6489-6498, 2020.

Lijun Wang, Huchuan Lu, Yifan Wang, Mengyang Feng, Dong Wang, Baocai Yin, and Xiang Ruan. Learning to detect salient objects with image-level supervision. In Proceedings of the IEEE conference on computer vision and pattern recognition, pp. 136-145, 2017.

Luke Melas-Kyriazi, Christian Rupprecht, Iro Laina, and Andrea Vedaldi. Deep spectral methods: A surprisingly strong baseline for unsupervised semantic segmentation and localization. In Proceedings of the IEEE/CVF Conference on Computer Vision and Pattern Recognition, pp. 8364-8375, 2022.

Luke Melas-Kyriazi, Christian Rupprecht, Iro Laina, and Andrea Vedaldi. Finding an unsupervised image segmenter in each of your deep generative models. arXiv preprint arXiv:2105.08127, 2021.

Margret Keuper, Bjoern Andres, and Thomas Brox. Motion trajectory segmentation via minimum cost multicuts. In Proceedings of the IEEE international conference on computer vision, pp. 3271-3279, 2015.

Margret Keuper, Siyu Tang, Bjoern Andres, Thomas Brox, and Bernt Schiele. Motion segmentation & multiple object tracking by correlation co-clustering. IEEE transactions on pattern analysis and machine intelligence, 42(1):140-153, 2018.

Margret Keuper. Higher-order minimum cost lifted multicuts for motion segmentation. In Proceedings of the IEEE International Conference on Computer Vision, pp. 4242-4250, 2017.

Maria-Elena Nilsback and Andrew Zisserman. Delving deeper into the whorl of flower segmentation. Image and Vision Computing, 28(6):1049-1062, 2010.

Mathilde Caron, Hugo Touvron, Ishan Misra, Hervé Jégou, Julien Mairal, Piotr Bojanowski, and Armand Joulin. Emerging properties in self-supervised vision transformers. In Proceedings of the IEEE/CVF International Conference on Computer Vision, pp. 9650-9660, 2021.

Max Wertheimer. Untersuchungen zur lehre von der gestalt. Gestalt Theory, 39(1): 79-89, 2017.

Meng Tang, Abdelaziz Djelouah, Federico Perazzi, Yuri Boykov, and Christopher Schroers. Normalized cut loss for weakly-supervised cnn segmentation. In Proceedings of the IEEE conference on computer vision and pattern recognition, pp. 1818-1827, 2018.

Meng Tang, Federico Perazzi, Abdelaziz Djelouah, Ismail Ben Ayed, Christopher Schroers, and Yuri Boykov. On regularized losses for weakly-supervised cnn segmentation. In Proceedings of the European Conference on Computer Vision (ECCV), pp. 507-522, 2018.

Mickaël Chen, Thierry Artières, and Ludovic Denoyer. Unsupervised object segmentation by redrawing. Advances in neural information processing systems, 32, 2019.

Mingyu Ding, Yikang Shen, Lijie Fan, Zhenfang Chen, Zitian Chen, Ping Luo, Joshua B Tenenbaum, and Chuang Gan. Visual dependency transformers: Dependency tree emerges from reversed attention. arXiv preprint arXiv:2304.03282, 2023.

Narayanan Sundaram, Thomas Brox, and Kurt Keutzer. Dense point trajectories by gpu-accelerated large displacement optical flow. In European conference on computer vision, pp. 438-451. Springer, 2010.

Nebojsa Jojic and Brendan J Frey. Learning flexible sprites in video layers. In Proceedings of the 2001 IEEE Computer Society Conference on Computer Vision and Pattern Recognition. CVPR 2001, vol. 1, pp. I-I. IEEE, 2001.

Olivier J Hénaff, Skanda Koppula, Evan Shelhamer, Daniel Zoran, Andrew Jaegle, Andrew Zisserman, João Carreira, and Relja Arandjelović . Object discovery and representation networks. arXiv preprint arXiv:2203.08777, 2022.

Oriane Siméoni, Gilles Puy, Huy V Vo, Simon Roburin, Spyros Gidaris, Andrei Bursuc, Patrick Pérez, Renaud Marlet, and Jean Ponce. Localizing objects with self-supervised transformers and No. labels. arXiv preprint arXiv:2109.14279, 2021.

Paul Vernaza and Manmohan Chandraker. Learning random-walk label propagation for weakly-supervised semantic segmentation. In Proceedings of the IEEE conference on computer vision and pattern recognition, pp. 7158-7166, 2017.

Pavel Tokmakov, Cordelia Schmid, and Karteek Alahari. Learning to segment moving objects. International Journal of Computer Vision, 127(3):282-301, 2019.

Pavel Tokmakov, Karteek Alahari, and Cordelia Schmid. Learning video object segmentation with visual memory. In Proceedings of the IEEE International Conference on Computer Vision, pp. 4481-4490, 2017.

Peter Ochs, Jitendra Malik, and Thomas Brox. Segmentation of moving objects by long term video analysis. IEEE transactions on pattern analysis and machine intelligence, 36(6):1187-1200, 2013.

Philip HS Torr. Geometric motion segmentation and model selection. Philosophical Transactions of the Royal Society of London. Series A: Mathematical, Physical and Engineering Sciences, 356(1740):1321-1340, 1998.

Philipp Krähenbühl and Vladlen Koltun. Efficient inference in fully connected crfs with gaussian edge potentials. Advances in neural information processing systems, 24, 2011.

Qiantong Xu, Tatiana Likhomanenko, Jacob Kahn, Awni Hannun, Gabriel Synnaeve, and Ronan Collobert. Iterative pseudo-labeling for speech recognition. arXiv preprint arXiv:2005.09267, 2020.

Qizhe Xie, Minh-Thang Luong, Eduard Hovy, and Quoc V Le. Self-training with noisy student improves imagenet classification. In Proceedings of the IEEE/CVF conference on computer vision and pattern recognition, pp. 10687-10698, 2020.

Relja Arandjelović and Andrew Zisserman. Object discovery with a copy-pasting gan. arXiv preprint arXiv:1905.11369, 2019.

Runsheng Zhang, Yaping Huang, Mengyang Pu, Jian Zhang, Qingji Guan, Qi Zou, and Haibin Ling. Object discovery from a single unlabeled image by mining frequent itemsets with multi-scale features. IEEE Transactions on Image Processing, 29:8606-8621, 2020.

Runtao Liu, Zhirong Wu, Stella Yu, and Stephen Lin. The emergence of objectness: Learning zero-shot segmentation from videos. Advances in Neural Information Pro-cessing Systems, 34:13137-13152, 2021.

Seunghoon Hong, Hyeonwoo Noh, and Bohyung Han. Decoupled deep neural network for semi-supervised semantic segmentation. Advances in neural information processing systems, 28, 2015.

Shuangrui Ding, Weidi Xie, Yabo Chen, Rui Qian, Xiaopeng Zhang, Hongkai Xiong, and Qi Tian. Motion-inductive self-supervised object discovery in videos. arXiv preprint arXiv:2210.00221, 2022.

Siyang Li, Bryan Seybold, Alexey Vorobyov, Alireza Fathi, Qin Huang, and C-C Jay Kuo. Instance embedding transfer to unsuper-

(56)        References Cited

OTHER PUBLICATIONS vised video object segmentation. In Proceedings of the IEEE conference on computer vision and pattern recognition, pp. 6526-6535, 2018.

Subhabrata Choudhury, Laurynas Karazija, Iro Laina, Andrea Vedaldi, and Christian Rupprecht. Guess what moves: Unsupervised video and image segmentation by anticipating motion. arXiv preprint arXiv:2205.07844, 2022.

Suyog Dutt Jain, Bo Xiong, and Kristen Grauman. Fusionseg: Learning to combine motion and appearance for fully automatic segmentation of generic objects in videos. In Proceedings of the IEEE conference on computer vision and pattern recognition, pp. 3664-3673, 2017.

Tam Nguyen, Maximilian Dax, Chaithanya Kumar Mummadi, Nhung Ngo, Thi Hoai Phuong Nguyen, Zhongyu Lou, and Thomas Brox. Deepusps: Deep robust unsupervised saliency prediction via self-supervision. Advances in Neural Information Processing Systems, 32, 2019.

Thomas Brox and Jitendra Malik. Object segmentation by long term analysis of point trajectories. In European conference on computer vision, pp. 282-295. Springer, 2010.

Van Huy Vo, Elena Sizikova, Cordelia Schmid, Patrick Pérez, and Jean Ponce. Large-scale unsupervised object discovery. Advances in Neural Information Processing Systems, 34:16764-16778, 2021.

Vickie Ye, Zhengqi Li, Richard Tucker, Angjoo Kanazawa, and Noah Snavely. Deformable sprites for unsupervised video decomposition. In Proceedings of the IEEE/CVF Conference on Computer Vision and Pattern Recognition, pp. 2657-2666, 2022.

Wei-Chih Hung, Yi-Hsuan Tsai, Yan-Ting Liou, Yen-Yu Lin, and Ming-Hsuan Yang. Adversarial learning for semi-supervised semantic segmentation. arXiv preprint arXiv:1802.07934, 2018.

Wenguan Wang, Jianbing Shen, Ruigang Yang, and Fatih Porikli. Saliency-aware video object segmentation. IEEE transactions on pattern analysis and machine intelligence, 40(1):20-33, 2017.

Wouter Van Gansbeke, Simon Vandenhende, and Luc Van Gool. Discovering object masks with transformers for unsupervised semantic segmentation. arXiv preprint arXiv:2206.06363, 2022.

Xiankai Lu, Wenguan Wang, Chao Ma, Jianbing Shen, Ling Shao, and Fatih Porikli. See more, know more: Unsupervised video object segmentation with co-attention siamese networks. In Proceedings of the IEEE/CVF conference on computer vision and pattern recognition, pp. 3623-3632, 2019.

Xu Ji, Joao F Henriques, and Andrea Vedaldi. Invariant information clustering for unsupervised image classification and segmentation. In Proceedings of the IEEE/CVF International Conference on Computer Vision, pp. 9865-9874, 2019.

Xudong Wang, Rohit Girdhar, Stella X Yu, and Ishan Misra. Cut and learn for unsupervised object detection and instance segmentation. arXiv preprint arXiv:2301.11320, 2023.

Yanchao Yang, Antonio Loquercio, Davide Scaramuzza, and Stefano Soatto. Unsupervised moving object detection via contextual information separation. In Proceedings of the IEEE/CVF Conference on Computer Vision and Pattern Recognition, pp. 879-888, 2019.

Yanchao Yang, Brian Lai, and Stefano Soatto. Dystab: Unsupervised object segmentation via dynamic-static bootstrapping. In Proceedings of the IEEE/CVF Conference on Computer Vision and Pattern Recognition, pp. 2826-2836, 2021.

Yangtao Wang, Xi Shen, Shell Xu Hu, Yuan Yuan, James L Crowley, and Dominique Vaufreydaz. Self-supervised transformers for unsupervised object discovery using normalized cut. In Proceedings of the IEEE/CVF Conference on Computer Vision and Pattern Recognition, pp. 14543-14553, 2022.

Yangtao Wang, Xi Shen, Yuan Yuan, Yuming Du, Maomao Li, Shell Xu Hu, James L Crowley, and Dominique Vaufreydaz. Tokencut: Segmenting objects in images and videos with self-supervised transformer and normalized cut. arXiv preprint arXiv:2209.00383, 2022.

Yaniv Benny and Lior Wolf. Onegan: Simultaneous unsupervised learning of conditional image generation, foreground segmentation, and fine-grained clustering. In European Conference on Computer Vision, pp. 514-530. Springer, 2020.

Yassine Ouali, Céline Hudelot, and Myriam Tami. Autoregressive unsupervised image segmentation. In European Conference on Computer Vision, pp. 142-158. Springer, 2020.

Yeong Jun Koh and Chang-Su Kim. Primary object segmentation in videos based on region augmentation and reduction. In 2017 IEEE conference on computer vision and pattern recognition (CVPR), pp. 7417-7425. IEEE, 2017.

Yu Zeng, Yunzhi Zhuge, Huchuan Lu, Lihe Zhang, Mingyang Qian, and Yizhou Yu. Multi-source weak supervision for saliency detection. In Proceedings of the IEEE/CVF conference on computer vision and pattern recognition, pp. 6074-6083, 2019.

* cited by examiner

900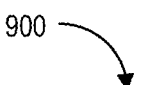

Determining, For A Digital Video, Optical Flow Patch Features Of Visual Elements Corresponding To A Plurality Of Image Patches From A Video Frame Of The Digital Video 902

Determining Image Patch Features Corresponding To A Plurality Of Image Patches From The Video Frame Of The Digital Video 904

Generating A Bi-Partitioned Graph 906

Generating A Plurality Of Nodes Corresponding To The Plurality Of Image Patches And 906a Generating Edges Between The Plurality Of Nodes With Corresponding Edge Weights Based On A Similarity Measure Between The Plurality Of Nodes 906b Generating Labels For The Digital Video Indicating A Foreground Region And A Background Region From A Segmentation Mask Based On The Bi-Partitioned Graph 908

*Fig. 9*

GENERATING IMAGE OBJECT SEGMENTATIONS UTILIZING GRAPH-CUT PARTITIONING IN SELF-SUPERVISED OBJECT DISCOVERY

BACKGROUND

Advancements in computing devices and computer design applications have given rise to a variety of innovations in computer image analysis and editing software. For example, image design systems have developed that provide tools for discovering and classifying visual objects within digital content from multiple domains such as visual digital content used with autonomous driving, augmented reality, human-computer interaction, and video summarization. For example, some computer design applications separate regions of a video sequence into foreground and background regions to predict regions containing visual objects. Also, some computer design applications provide tools to analyze information from digital images to localize objects within digital images. To localize regions containing the visual objects, many current computer design applications use deep neural networks trained on large, annotated datasets. Notably, partly due to the complexity inherent in visual object classification, it is often difficult for computer systems to produce high-quality object segmentation masks in a timely manner with limited computing resources on a variety of objects given differing image/video qualities and object boundaries. Accordingly, the state of the art exhibits a number of shortcomings with regard to flexibility, accuracy, and computational efficiency when analyzing, discovering, and segmenting visual digital content.

SUMMARY

One or more embodiments provide benefits and/or solve one or more of the foregoing or other problems in the art with systems, methods, and non-transitory computer readable storage media that provide a self-supervised object discovery system that combines motion and appearance information to generate a segmentation mask from a digital image or digital video and delineate one or more salient objects within the digital image/digital video. In particular, in one or more implementations, the disclosed systems provide a digital video to a neural network encoder to generate a segmentation mask in a graph-cut process that leverages motion information in combination with appearance information. For example, the disclosed systems utilize the neural network encoder to generate a fully connected graph based on image patches from the digital input, incorporating image patch feature and optical flow patch feature similarities to produce edge weights. In certain embodiments, the disclosed systems partition the generated graph to produce a segmentation mask representing the foreground and background of the digital input. Furthermore, in some implementations, the disclosed systems perform an initial training operation on a segmentation model using the segmentation mask as a pseudo-ground truth. In addition, in some implementations, the disclosed systems iteratively train the segmentation network based on the segmentation network outputs via a bootstrapped, self-training process. By utilizing both motion and appearance information to generate a bi-partitioned graph, the disclosed systems produce high-quality object segmentation masks in a self-supervised object discovery approach.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIG. 9 illustrates a flowchart of a series of acts for generating a segmentation mask in accordance with one or more embodiments.

DETAILED DESCRIPTION

Figure 1:
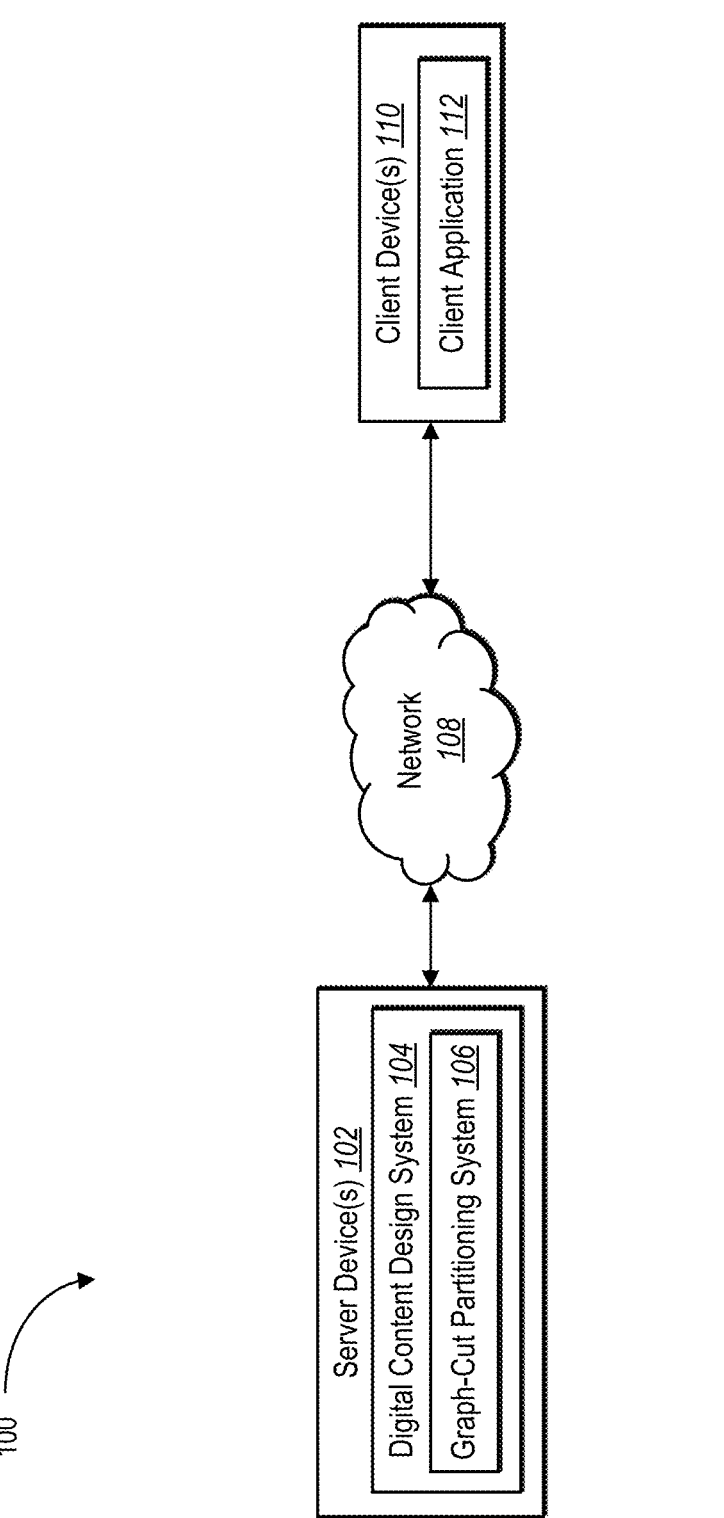
FIG. 1 illustrates a schematic diagram of an example environment of a graph-cut partitioning system in accordance with one or more embodiments.

This disclosure describes one or more embodiments of a graph-cut partitioning system that utilizes a self-supervised object discovery system that combines motion and appearance information to generate a segmentation mask from a digital image or digital video to delineate salient objects within the input. In particular, the disclosed systems utilize a neural network encoder to generate a bi-partitioned graph in a graph-cut process based on similarities between image patch features and optical flow features to generate a segmentation mask representing a foreground and background of the digital input. Furthermore, in some implementations, the disclosed systems bootstrap a segmentation model trained on the segmentation mask as a pseudo-ground truth generated via the graph-cut process.

In particular, in one or more implementations, the disclosed systems utilize a neural network encoder on a digital video and, based on optical flow features in linear combination with image patch features to produce edges weights, generate segmentation masks. For example, the graph-cut partitioning system utilizes the neural network encoder to generate a graph based on a similarity measure between image patches from the digital video. To illustrate, the graph-cut partitioning system generates a fully connected graph with vertices corresponding to the image patches, edges connecting the vertices, and edge weights produced by incorporating similarities between image patch features and optical flow patch features. In certain embodiments, the graph-cut partitioning system partitions the graph to produce a binary segmentation mask representing a foreground and background of the digital input. By utilizing both motion and appearance information to generate edge weights, the graph-cut partitioning system produces high-quality object segmentation masks in a self-supervised object discovery approach.

Furthermore, in some implementations, the graph-cut partitioning system trains a segmentation model based on the binary segmentation mask. For example, the graph-cut partitioning system initially trains a segmentation model to generate segmentation masks by using the binary segmentation mask from the graph-cut process as a pseudo-ground truth. In addition, the graph-cut partitioning system iteratively trains the segmentation network to generate segmentation masks based on the segmentation model output via a bootstrapped, self-training process. To illustrate, the graph-cut partitioning system trains the segmentation network on a fixed dataset in each iterative round of training. In addition, in one or more embodiments, the graph-cut partitioning system utilizes the trained segmentation network to determine an object within a digital video and/or a digital image.

In contrast to the disclosed systems, conventional segmentation systems have a number of technical shortcomings with regard to flexibility, accuracy, and computational efficiency when generating segmentation masks. As one example, many conventional digital segmentation systems lack flexibility. To illustrate, current conventional systems approach the development of video segmentation and image segmentation techniques disjointly. Indeed, current methods and techniques developed for video segmentation and image segmentation are treated as separate systems without overlap or integration between the two. Furthermore, some conventional systems (for both video segmentation and image segmentation) utilize deep neural networks trained on large, annotated datasets that drive dataset-specific considerations in model design which limits the performance of the conventional systems on real-world data. Indeed, many conventional systems are not adaptable to new, unseen data that do not follow the same distribution or characteristics as the training datasets, which results in overfitting and inaccuracies of the segmentation masks.

Conventional systems also suffer from inaccuracies. In particular, by utilizing only optical flow or appearance clues, many conventional systems provide less accurate segmentation masks. To illustrate, many unsupervised video object segmentation systems utilize only the principle of common fate (e.g., "things that move together belong together") to determine salient objects in videos under the assumption that pixels that move with a similar velocity most likely belong to the same object. However, these video object segmentation systems encounter ambiguities when determining segmentation masks owing to object occlusions or lack of motion. In consequence, existing video object segmentation systems provide less accurate segmentation masks. As related to digital images, many unsupervised object discovery systems utilize strategies (e.g., a bounding box, seed expansion) to localize an object within a digital image. Notably, these object discovery systems focus on object localization and not the more accurate object delineation task of object segmentation.

Conventional segmentation systems also have a number of technical shortcomings with regard to computational efficiency when generating segmentation masks. For example, many conventional systems utilize deep neural networks trained on large, annotated datasets created via many human interactions with computing devices (e.g., to create human-labeled datasets of digital images). Some conventional systems attempt segmentation with only a fraction of human-labeled image datasets; nonetheless, both weak-supervised and semi-supervised techniques still rely on human supervision in some form, which takes a significant amount of time and computing resources (e.g., many computing devices with many interactions via the computing devices).

Furthermore, conventional systems tailored to dataset-specific considerations lead to an increase in model complexity and require more computational resources, both in terms of memory and processing power. What is more, conventional systems tuned to a specific dataset often require significant retraining when be applied to another dataset, which is computationally expensive. In addition, these conventional systems require more extensive data preprocessing operations such as normalization, transformation, or dimensionality reduction on the dataset, which is also computationally intensive. Furthermore, many conventional systems are computationally slower during inference, especially if the model is complex or requires extensive preprocessing of input data or postprocessing of output data.

As suggested above, embodiments of the graph-cut partitioning system provide a variety of advantages over conventional segmentation systems. Indeed, in some embodiments, the graph-cut partitioning system provides a self-supervised object discovery system that flexibly, accurately, and efficiently combines optical flow features and image patch features to generate a segmentation mask from a digital video. For instance, the graph-cut partitioning system improves operational flexibility when generating segmentation masks. In contrast to conventional systems that disjointly develop video segmentation and image segmentation techniques, the graph-cut partitioning system generates object segmentation masks for digital videos and digital images from the same trained segmentation network. In particular, the graph-cut partitioning system trains a segmentation network on individual frames of videos for applying the trained segmentation network on both videos and standalone digital images. Moreover, while some conventional systems utilize deep neural networks trained on large, annotated datasets that drive dataset-specific considerations in model design, the graph-cut partitioning system utilizes a self-supervised object discovery approach that leverages motion and appearance information from unlabeled or labeled datasets to produce high-quality object segmentation masks.

Furthermore, in one or more implementations, the graph-cut partitioning system improves accuracy by utilizing both motion and appearance information to generate high-quality object segmentation masks. In particular, by utilizing object appearance information in addition to motion information, the graph-cut partitioning system provides stronger cues for object discovery and relieve the segmentation network of ambiguities owing to occlusions or lack of motion. In particular, by utilizing video datasets to obtain a robust mapping of foreground objects according to the appearance information and motion information, the graph-cut partitioning system generates segmentation masks for use in training an image segmentation network.

Additionally, in some embodiments, the graph-cut partitioning system refines predictions of a segmentation network via bootstrapped, self-training of the image segmentation network to boost the ability of the graph-cut partitioning system to discover objects in videos and images. Indeed, as outlined below, the graph-cut partitioning system achieves improved results on unsupervised video object segmentation (VOS) benchmarks utilizing a simple and fully unsupervised pipeline. Furthermore, unlike unsupervised object discovery systems that focus on object localization within a digital image, the graph-cut partitioning system solves the more complex task of object segmentation of the digital image utilizing a self-supervised object discovery approach that provides a more granular analysis of the digital image.

In addition, the graph-cut partitioning system provides improved computational efficiency by providing an efficient end-to-end unsupervised pipeline to detect salient foreground regions for applying to video datasets and digital image analysis. In particular, unlike conventional systems that focus on distilling hand-crafted priors into a network initialized with image classifiers, the graph-cut partitioning system utilizes a self-supervised approach with unlabeled video training datasets to generate segmentation masks for training an image segmentation network. Notably, the graph-cut partitioning system provides a fully unsupervised model that does not require any additional inputs (such as optical flow) at the time of inference, which provides a significant savings in computational resources. Moreover, in some embodiments, the graph-cut partitioning system functions with few or no post-processing steps, unlike many conventional systems that require heavy post-processing techniques at inference, thereby reducing system computational time, memory usage, energy consumption, and hardware utilization.

Additional detail regarding the graph-cut partitioning system will now be provided with reference to the figures. For example, FIG. 1 illustrates a schematic diagram of an exemplary system environment ("environment") 100 in which a graph-cut partitioning system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the graph-cut partitioning system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 9). Moreover, the server device(s) 102 and client device(s) 110 include one of a variety of computing devices (including one or more computing devices as discussed in greater detail with relation to FIG. 9).

As illustrated in FIG. 1, the environment 100 includes the digital content design system 104. The digital content design system 104 generates, tracks, stores, processes, receives, and transmits electronic data, including digital videos, digital images, and segmentation masks. For example, the digital content design system 104 receives or monitors interactions across the client device(s) 110. In some implementations, the digital content design system 104 transmits content to the client device(s) 110 to cause the client device(s) 110 to display content associated with digital videos and digital images. For example, the digital content design system 104 displays digital videos and/or digital images to client device(s) 110 and displays segmentation masks on the client device(s) 110 with the digital videos and/or digital images (e.g., via client application(s) 112).

Additionally, the digital content design system 104 includes all, or a portion of, the graph-cut partitioning system 106. For example, the graph-cut partitioning system 106 operates on the server device(s) 102 to access digital content (including digital videos, digital images, and/or segmentation masks), determine digital content changes, and provide localization of content changes to the client device(s) 110. In one or more embodiments, via the server device(s) 102, the graph-cut partitioning system 106 generates and displays digital videos, digital images, and/or segmentation masks based on a graph-cut process that generates bi-partitioned graphs for the digital images/digital videos. Example components of the graph-cut partitioning system 106 will be described below with regard to FIG. 9.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 9. In some embodiments, the client device(s) 110 detect interactions by a user to perform a variety of functions via respective client application(s) 112 such as the generation and modification of segmentation masks. The client device(s) 110 include one or more applications (e.g., the client application(s) 112) that access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

In various embodiments, the graph-cut partitioning system 106 are implemented in whole, or in part, by the individual elements of the environment 100. Indeed, as shown in FIG. 1, the graph-cut partitioning system 106 is implemented on the server device(s) 102. In alternative embodiments, the graph-cut partitioning system 106 is implemented in whole, or in part, on the client device(s) 110. In particular embodiments, the graph-cut partitioning system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the graph-cut partitioning system 106 on the client device(s) 110 represents and/or provides the same or similar functionality as described herein in connection with the graph-cut partitioning system 106 on the server device(s) 102. In some implementations, the graph-cut partitioning system 106 on the server device(s) 102 supports the graph-cut partitioning system 106 on the client device(s) 110.

In some embodiments, the graph-cut partitioning system 106 includes a web hosting application that allows the client device(s) 110 to interact with content and services hosted on the server device(s) 102. To illustrate, in one or more implementations, the client device(s) 110 accesses a web page or computing application supported by the server device(s) 102. The client device(s) 110 provides input to the server device(s) 102 (e.g., selected content items). In response, the graph-cut partitioning system 106 on the server device(s) 102 generates/modifies digital content. The server device(s) 102 then provides the digital content to the client device(s) 110.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

Figure 2:
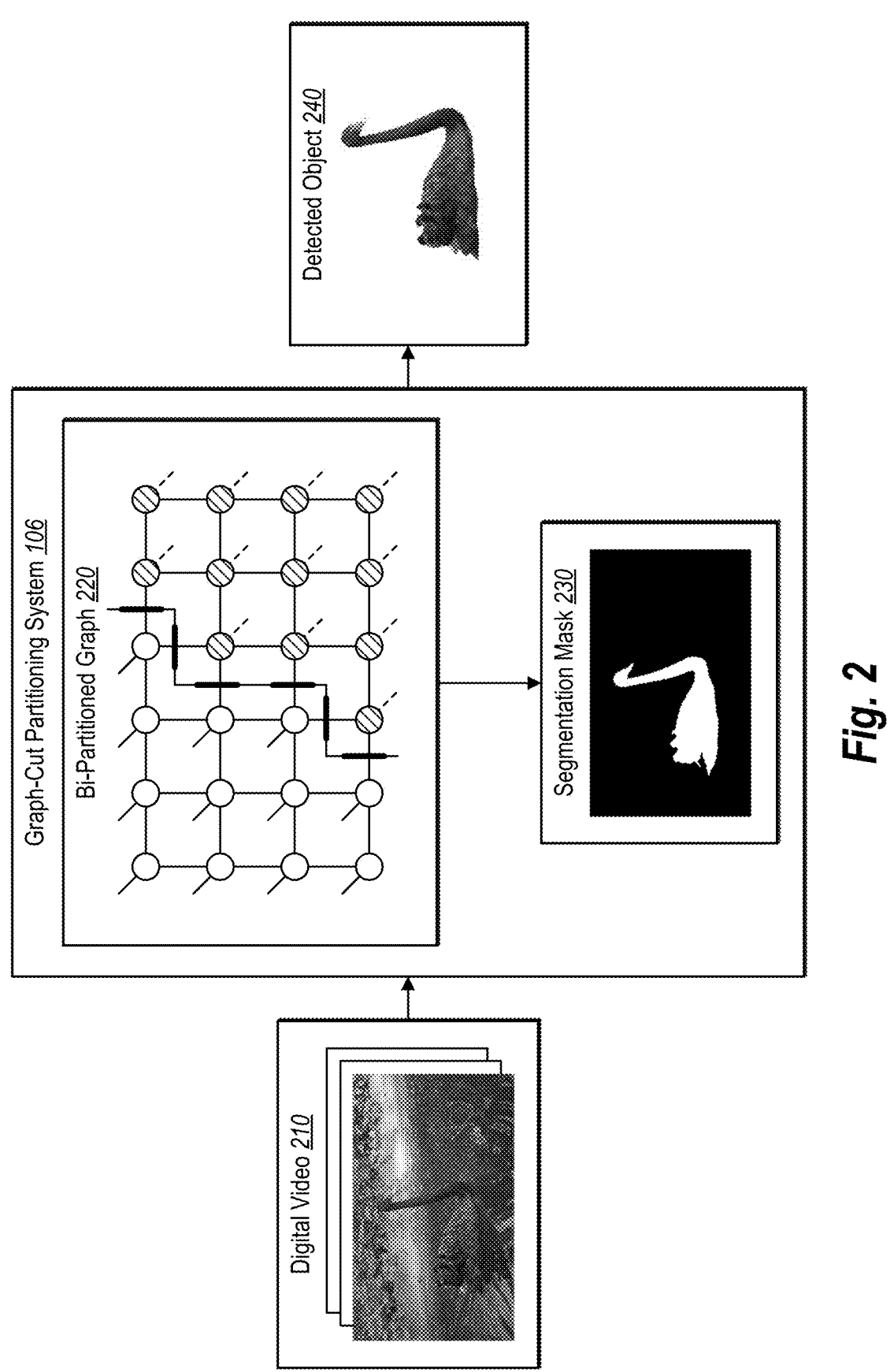
FIG. 2 illustrates an example overview of using a graph-cut partitioning system to generate a segmentation mask and detect an object within a digital video in accordance with one or more embodiments.

As previously mentioned, in one or more embodiments, the graph-cut partitioning system 106 combines motion and appearance information to generate a segmentation mask. FIG. 2 illustrates an example overview of using a graph-cut partitioning system to generate a segmentation mask and detect an object within a digital video in accordance with one or more embodiments. Additional detail regarding the various acts of FIG. 2 is provided thereafter with reference to subsequent figures.

As shown in FIG. 2, the graph-cut partitioning system 106 receives a digital video 210, utilizes a bi-partitioned graph 220 to generate a segmentation mask 230, and determines a detected object 240 utilizing a fully unsupervised method. In particular, the graph-cut partitioning system 106 utilizes a self-supervised graph-cut process to generate segmentation masks. Additionally, the graph-cut partitioning system 106 utilizes the graph-cut process to train one or more segmentation models.

In one or more embodiments, the graph-cut partitioning system 106 processes digital video 210 including a sequence of unannotated digital visual data presented as a continuous stream. For example, the digital video 210 includes multiple unannotated video frames (still images) displayed in rapid succession to create the illusion of motion. In addition, a video frame of the digital video 210 includes a still image with a combination of pixels arranged in a grid (e.g., each pixel represents a color value such as in a 3-channel RGB format).

Furthermore, the digital video 210 includes one or more salient objects (discoverable as one or more detected object(s) 240) that are visually identifiable entities which include anything that is recognizable, has a specific form or shape, and occupies a space within the digital video 210. For example, the detected object 240 includes a distinct physical item, element, or subject that is identified by its visual characteristics and attributes. To illustrate, the detected object 240 ranges from everyday items such as a flower, vehicle, and structure to more complex entities like an animal or person. In one or more embodiments, the graph-cut partitioning system 106 receives annotated, unannotated, or semi-annotated data for the digital video 210. In alternative embodiments, the graph-cut partitioning system 106 also processes individual (e.g., separate and unrelated) digital images.

As mentioned, the graph-cut partitioning system 106 utilizes a neural network to generate a bi-partitioned graph 220 based on image patches from the digital video 210. In certain embodiments, the graph-cut partitioning system 106 generates a bi-partitioned graph 220, which includes a fully connected graph, or a complete graph, in which there is a direct edge connecting every pair of distinct vertices. The graph-cut partitioning system 106 incorporates image patch feature similarities and optical flow patch feature similarities to produce edge weights for the bi-partitioned graph 220. In addition, in certain embodiments, the graph-cut partitioning system 106 generates the bi-partitioned graph 220 using an adjacency matrix to represent which vertices (or nodes) of the bi-partitioned graph 220 are adjacent to which other vertices.

In certain embodiments, the graph-cut partitioning system 106 partitions the generated bi-partitioned graph 220 using a graph-cut process to produce a segmentation mask 230. In one or more embodiments, a segmentation mask 230 includes a digital representation used to delineate certain regions or detected object(s) 240 within the digital video 210. For example, the segmentation mask 230 "masks" or highlights areas of interest, allowing for further analysis or processing of those specific regions. In certain embodiments, the segmentation mask 230 includes an image of the same size as the video frames within the digital video 210, where each pixel has a label indicating which segment (or object) it belongs to. Pixels belonging to the same segment or object have the same label, while pixels that don't belong to any object of interest are labeled as background. For example, the graph-cut partitioning system 106 labels the pixels as either foreground (object(s) of interest) with a value of 1, or background with a value of 0. In some implementations, the graph-cut partitioning system 106 utilizes the segmentation mask 230 to determine the detected object 240.

Furthermore, in some implementations, the graph-cut partitioning system 106 trains a segmentation model based on the segmentation mask 230. For example, the graph-cut partitioning system 106 performs an initial training operation on a segmentation model using the segmentation mask 230 as a pseudo-ground truth. In some embodiments, the graph-cut partitioning system 106 iteratively trains the segmentation model based on the segmentation model outputs via a bootstrapped, self-training process. In some implementations, the graph-cut partitioning system 106 utilizes the segmentation model to determine the detected object 240 or to detect objects in additional digital images/videos.

Figure 3:
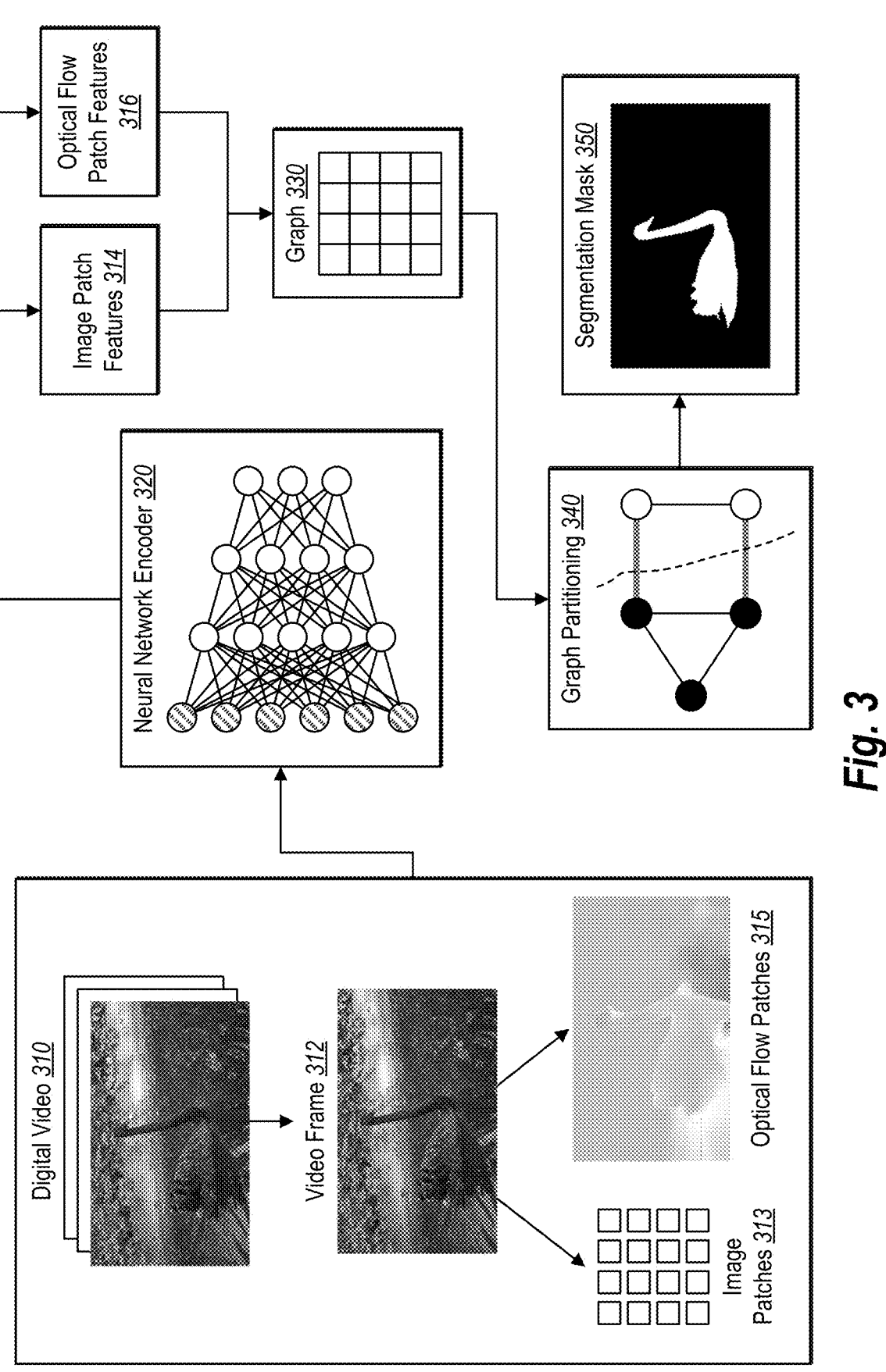
FIG. 3 illustrates an example of generating a segmentation mask from a digital video via a graph-cut process in accordance with one or more embodiments.

As previously mentioned, in one or more embodiments, the graph-cut partitioning system 106 combines motion and appearance information to generate a segmentation mask from a digital image or digital video. FIG. 3 illustrates an example of generating a segmentation mask from a digital video via a graph-cut process in accordance with one or more embodiments.

As shown in FIG. 3, the graph-cut partitioning system 106 receives a digital video 310 and determines image patches 313 and optical flow patches 315 corresponding to a video frame 312 of the digital video 310. In one or more embodiments, an image patch corresponds to a specific portion of a digital image (e.g., a small region or subset of an image). Furthermore, an optical flow patch includes motion information determined for a specific portion of a digital image (e.g., a velocity distribution for pixels of an image patch).

In one or more embodiments, the graph-cut partitioning system 106 generates image patch features 314 from the image patches 313 and optical flow patch features 316 from the optical flow patches 315 utilizing a neural network encoder 320. In particular, the neural network encoder 320 includes a neural network of a plurality of neural network layers to encode visual features of the image patches and optical flow patches into a feature space. For example, the neural network encoder 320 includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network, a transformer-based neural network, or a feedforward neural network. Accordingly, in some embodiments, a neural network encoder includes a self-supervised vision transformer to encode features of the image patches and optical flow patches.

For example, image patch features 314 correspond to local features representative of distinctive characteristics or attributes from the image patches 313 of the video frame 312 of the digital video 310. To illustrate, image patch features 314 include intensity values (e.g., grayscale intensities or RGB values for color images), texture features (e.g., patterns, smoothness, coarseness, or regularity), gradient features (e.g., change in intensity corresponding to edges, contours, and texture), frequency domain features (e.g., periodic patterns, oscillations, or multi-scale information), shape features (e.g., geometric or structural information), and/or color features (e.g., distribution, histograms, moments, or correlograms) of image patches of the video frame 312. The neural network encoder 320 extracts such visual features from the video frame 312 and encodes the extracted features in a feature space (e.g., in a feature vector or matrix).

In addition, the graph-cut partitioning system 106 generates optical flow patch features 316 from the optical flow patches 315 of the video frame 312 of the digital video 310. The graph-cut partitioning system 106 generates optical flow patch features 316 based on the optical flow stored in the optical flow patches 315 corresponding to the image patches 313. Optical flow patch features 316 capture the motion information between image patches in consecutive video frames of the digital video 310. For example, optical flow patch features 316 describe the apparent motion, movement, or velocity of objects, surfaces, and edges in the digital video 310 caused by the relative motion between an observer and digital elements within the scene. In certain embodiments, the graph-cut partitioning system 106 utilizes an RGB-optical flow estimator model to compute optical flow (e.g., in 3-channel RGB format) and represent the apparent motion, movement, or velocity of objects, surfaces, and edges of image patches in the video frame 312 of the digital video 310 in a color space (e.g., in optical flow patches corresponding to the image patches 313 of the video frame 312).

Figure 5:
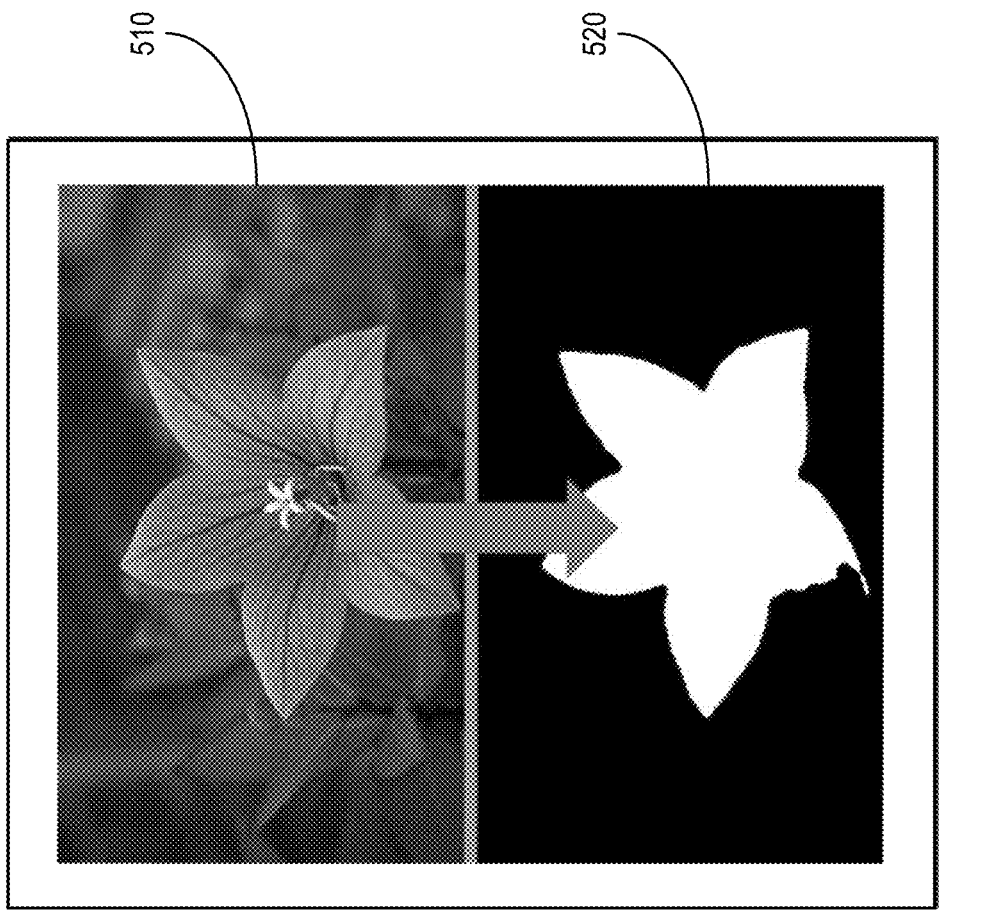
FIG. 5 illustrates an example of a segmentation mask generated by the graph-cut partitioning system in accordance with one or more embodiments.
Figure 6:
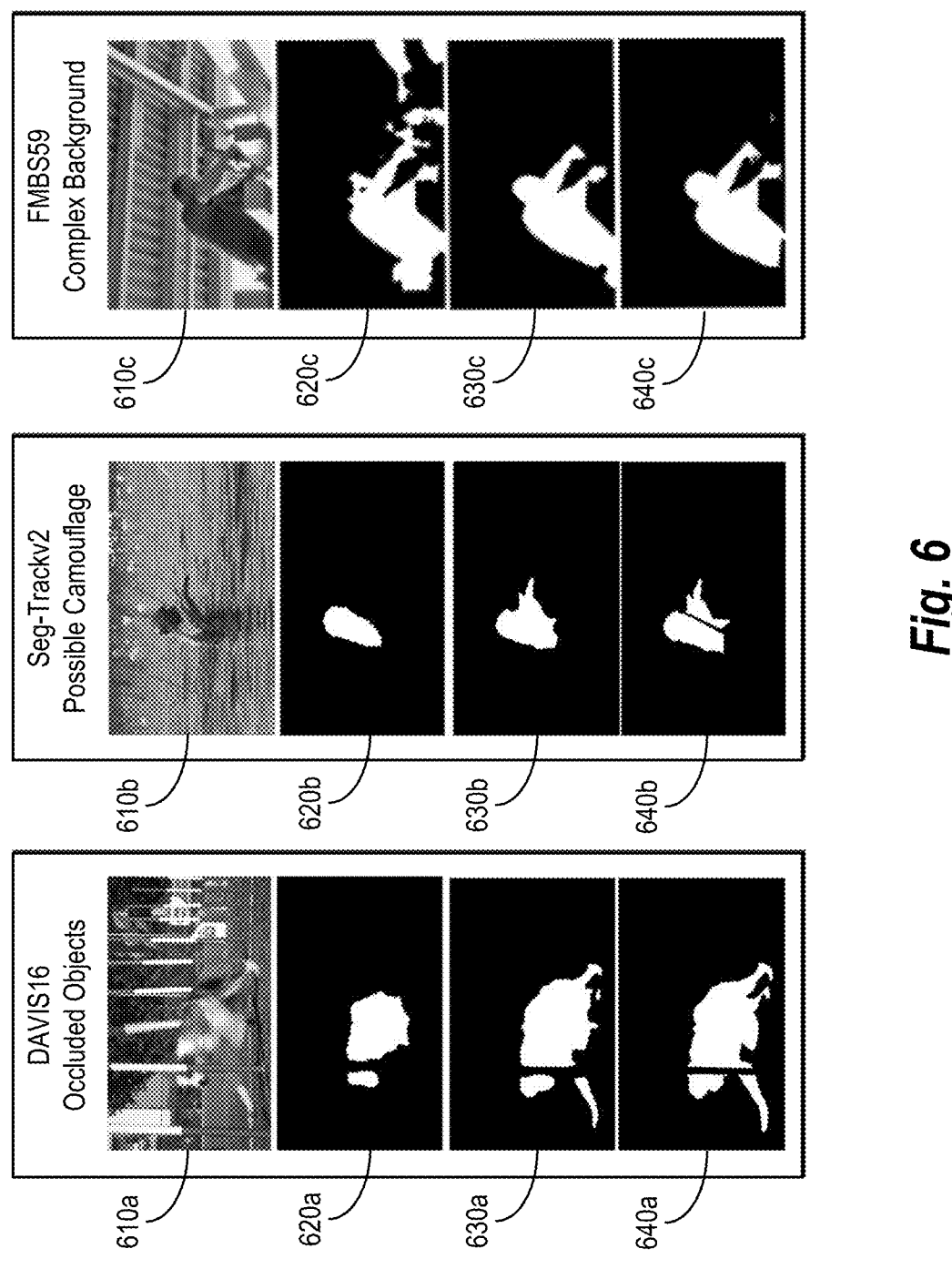
FIG. 6 illustrates a comparison of qualitative examples of segmentation masks generated from video frames of digital videos by the graph-cut partitioning system in accordance with one or more embodiments.
Figure 7:
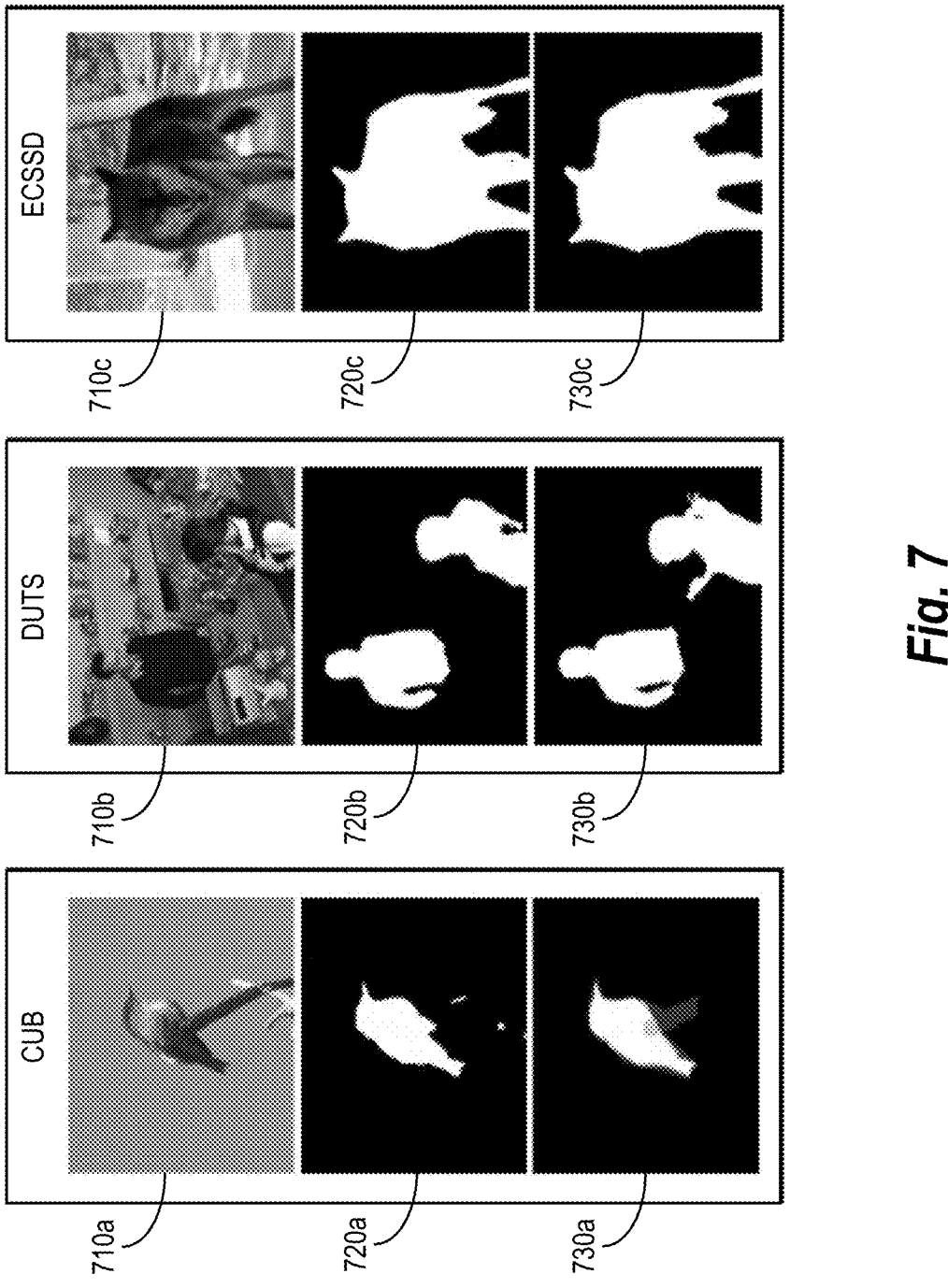
FIG. 7 illustrates qualitative examples of segmentation masks generated from digital images by the graph-cut partitioning system in accordance with one or more embodiments.

To illustrate, in certain implementations, the graph-cut partitioning system 106 determines the optical flow features by denoting the image frames of a given video by the sequence, $f_1, f_2, \ldots, f_N$. For a frame $f_i$, the graph-cut partitioning system 106 computes the optical flow between $f_i$ and $f_{i+1}$ for $1 \leq i < N$. For $i=N$, the graph-cut partitioning system 106 takes the optical flow between $f_N$ and $f_{N-1}$ for use in graph partitioning 340 (e.g., graph-cut partitioning). In one or more embodiments, the obtained optical flow includes a 2-channel tensor indicating displacement of pixels in horizontal and vertical directions. Additionally, in some embodiments, the graph-cut partitioning system 106 converts the 2-channel tensor to a 3-channel tensor (in RGB format) for providing to the neural network encoder 320 (e.g., via the optical flow patches 315) to generate the optical flow patch features 316. The graph-cut partitioning system 106 provides robustness regarding the choice of an optical flow estimation model. In particular, the graph-cut partitioning system 106 performs well in a fully unsupervised setting (as shown in FIGS. 5-7) using an ARFlow model as described by Liang Liu, Jiangning Zhang, Ruifei He, Yong Liu, Yabiao Wang, Ying Tai, Donghao Luo, ChengjieWang, Jilin Li, and Feiyue Huang in "Learning by analogy: Reliable supervision from transformations for unsupervised optical flow estimation," in Proceedings of the IEEE/CVF conference on computer vision and pattern recognition, pages 6489-6498, 2020.

Notably, the graph-cut partitioning system 106 is applicable to annotated, unannotated, or partially annotated video datasets (e.g., digital video 310). For example, the graph-cut partitioning system 106 is applicable in a semi-supervised setting in which partially annotated datasets are available. In these cases, the graph-cut partitioning system 106 provides segmentation masks for the unannotated part of the dataset (e.g., for the FBMS59 dataset, only 720 out of ~13 k video frames are annotated). In cases of annotated datasets, the graph-cut partitioning system 106 generates segmentation masks that are compared to the annotated dataset or utilized instead of the annotated dataset.

As further shown, the graph-cut partitioning system 106 utilizes the neural network encoder 320 to obtain key features (e.g., image patch features 314 and optical flow patch features 316) for constructing a graph 330. Specifically, the graph-cut partitioning system 106 generates a graph including nodes representing the image patches according to the image patches and edges representing relationships (e.g., similarities) between the patches according to the information from the image patch features 314 and the optical flow patch features 316. For instance, the graph-cut partitioning system 106 uses the appearance information from the image patch features 314 and the motion information from the optical flow patch features 316 to determine similarities (e.g., edges and edge weights) between the image patches (e.g., nodes).

To illustrate, consider a video frame 312 of the digital video 310 which contains representations of foreground objects. The graph-cut partitioning system 106 generates a fully connected graph G=(V,E) (e.g., graph 330), where V is obtained by dividing the video frame 312 into image patches of size $p_s \times p_s$, and E denotes the edges between these image patches that quantify the similarity (e.g., similarity measure). More specifically, the graph-cut partitioning system 106 determines an adjacency matrix W underlying E that comprises elements $w_{ij}=S(v_i,v_j)$, where $S(\cdot)$ is the similarity measure between two given vertices (e.g., image patches).

To incorporate motion signals in the edge weights, the graph-cut partitioning system 106 utilizes similarities between the image patch features and corresponding optical flow patch features of the image patches in combination (e.g., via a linear combination) to determine the similarity measure. In particular, the graph-cut partitioning system 106 determines key features from the last attention layer of the neural network encoder 320. The graph-cut partitioning system 106 determines S from:

$$S(v_i, v_j) = \alpha \cdot S'(\phi(v_i), \phi(v_j)) + (1-\alpha) \cdot S'(\phi(\psi(v_i)), \phi(\psi(v_j)))$$

Where $\alpha \in [0,1]$, $\phi(\cdot)$ denotes the neural network encoder 320, $\psi(\cdot)$ denotes an optical flow estimator (e.g., 3-channel RGB optical flow model), and $S'(\cdot)$ is the cosine similarity function, given by $$S'(\vec{x}, \vec{y}) = \frac{\vec{x} \cdot \vec{y}}{\|\vec{x}\|_2 \|\vec{y}\|_2}.$$

For example, the cosine similarity function includes a metric that the graph-cut partitioning system 106 uses to determine the cosine of the angle between the two non-zero vectors $\vec{x}$ and $\vec{y}$ in an inner product space. In one or more embodiments, the graph-cut partitioning system 106 thus determines a similarity measure between the two vectors $\vec{x}$ and $\vec{y}$ that takes into account the magnitude and direction of the vectors, rather than just their absolute values.

Further, in one or more embodiments, the graph-cut partitioning system 106 determines W using the S defined above (e.g., $W=[w_{ij}]=[S(v_i,v_j)]$). In addition, the graph-cut partitioning system 106 normalizes $w_{ij}$'s by thresholding on a weight threshold hyper-parameter $\tau$. In certain implementations, the graph-cut partitioning system 106 utilizes a similarity edge threshold of $\tau=0.25$ and a linear combination coefficient of $\alpha=0.7$ (e.g., $\alpha=1.0$ and $\alpha=0.0$ represent the cases when only image patch features and only optical flow patch features are used). In alternative embodiments, the graph-cut partitioning system 106 utilizes other values of a similarity edge threshold and/or linear combination coefficients (e.g., from values in the range of 0 to 1). The graph-cut partitioning system 106 utilizes the value of $\varepsilon$ to $10^{-5}(\neq 0)$ to normalize $w_{ij}$'s using the following requirement:

$$w_{ij} \leftarrow \begin{cases} 1, & \text{if } w_{ij} \geq \tau \\ \varepsilon, & \text{otherwise} \end{cases}$$

Hence, the graph-cut partitioning system 106 obtains a fully connected graph G (e.g., graph 330) on the image patches 313 of the video frame 312. The graph-cut partitioning system 106 performs the above process independently for each video frame in the digital video 310. In this way, the graph-cut partitioning system 106 includes information for both image patch features 314 and optical flow patch features 316 in the construction of graph 330 as described above.

As further shown, the graph-cut partitioning system 106 performs graph partitioning 340 on the graph 330. In particular, the graph-cut partitioning system 106 partitions the nodes in the graph 330 into two separate groups based on the relationships between the nodes (e.g., image patches) represented by the edges. For example, the graph-cut partitioning system 106 partitions the graph-cut process to separate nodes based on a detected foreground region and a detected background region according to the information in the edges. To illustrate, by determining edge weights utilizing similarities in both appearance and motion information of image patches, the graph-cut partitioning system 106 accurately detects patches including foreground/background regions. Accordingly, the graph-cut partitioning system 106 accurately separates the nodes in the graph 330 into foreground and background partitions.

In one or more embodiments, the graph-cut partitioning system 106 utilizes an Ncut algorithm (e.g., graph partitioning 340) to find the optimal bi-partition of image patches corresponding to nodes in the graph 330. For example, the graph-cut partitioning system 106 first generates graph G=(V,E) (e.g., graph 330) where V is a set of nodes (e.g., image patches) and E is a set of edges between the nodes. Additionally, the graph-cut partitioning system 106 partitions G into two disjoint sets, namely P and Q. The graph-cut partitioning system 106 determines the sets P and Q while minimizing the sum of the weights of the edges being cut (i.e., edges that connect nodes in P to nodes in Q). Additionally, the graph-cut partitioning system 106 maximizes internal coherence within each set (i.e., the similarity or connection strength between nodes within P or within Q). The graph-cut partitioning system 106 minimizes the Ncut energy by the optimal graph-cut, as given by:

$$Ncut(P, Q) = \frac{U(P, Q)}{U(P, V)} + \frac{U(P, Q)}{U(Q, V)}$$

In one or more embodiments, the graph-cut partitioning system 106 defines a similarity measure U between two sets P and Q. In particular, $U(P,Q)=\Sigma_{i,j}w(p_i,q_j)$, where $p_i$ and $q_j$ are the nodes in subgraphs P and Q respectively and $w(p_i,q_1)$ denotes the edge weight between these two nodes. The graph-cut partitioning system 106 determines a diagonal matrix D with the diagonal elements given by $d_i=\Sigma_j E_{ij}$. Minimizing the Ncut energy by the optimal graph-cut is equivalent to:

$$\min_{x} Ncut(x) = \min_{y} \frac{y^T(D-E)y}{y^T Dy}$$

where $\gamma \in \{1,-b\}^N$ and b satisfies $y^T D1=0$. Further, assigning $$z = D^{\frac{1}{2}}y$$

results in the following optimization:

$$\min_{z} \frac{z^T D^{-\frac{1}{2}}(D-E)D^{-\frac{1}{2}}z}{z^T z}$$

In one or more embodiments, the graph-cut partitioning system 106 utilizes the second smallest eigenvector to minimize the Ncut energy. In particular, the graph-cut partitioning system 106 assigns $$z = D^{\frac{1}{2}}y,$$

and determines the second smallest eigenvector, $y_1$, of the following eigensystem to generate a solution to the Ncut equation:

$$(D-E)y = \lambda Dy$$

To further bi-partition the graph, the graph-cut partitioning system 106 utilizes the average value of the second smallest eigenvector, $$\overline{y_1} = \sum_h y_i^j.$$

Specifically, the graph-cut partitioning system 106 determines the bi-partitions P and Q as given by $$\{v_j | y_i^j \geq \overline{y_1}\}$$

and $$\{v_j | y_i^j < \bar{y}_1\}$$

respectively.

As further shown, the graph-cut partitioning system 106 generates the segmentation mask 350. In particular, using the method described above, the graph-cut partitioning system 106 generates a segmentation mask 350 that separates one or more objects of interest from the background of the video frame 312 of the digital video 310. For example, the graph partitioning 340 step separates the video frame 312 into categories to identify the different regions or objects within the video frame. The segmentation mask includes labels for categories based on the graph partitioning 340. For example, the graph-cut partitioning system 106 classifies each pixel (or image patch) in the image into one of two categories of background or foreground, with each category assigned a unique label.

In particular, the graph-cut partitioning system 106 utilizes an Ncut algorithm to find the optimal bi-partition of image patches for the graph partitioning 340 by solving for the second-smallest eigenvector. Further, in some embodiments, to differentiate foreground patches from the background patches, the graph-cut partitioning system 106 utilizes the heuristics: (i) the foreground patches are more dominant, hence the image patch corresponding to the maximum absolute value in the second smallest eigenvector should belong to the foreground, and (ii) the foreground should occupy less than two corners in the image. Based on these heuristics, the graph-cut partitioning system 106 assigns the value 0 to the background patches, and 1 to the foreground patches to generate a binary segmentation mask 350 for the video frame 312 of the digital video 310.

Furthermore, in certain embodiments, since the foreground and background partitions are identified at patch-level, the graph-cut partitioning system 106 performs a single step of post-processing using a probabilistic graphical model (e.g., a Conditional Random Fields (CRF) model) to obtain a binary segmentation mask at pixel-level. In particular, the graph-cut partitioning system 106 utilizes the probabilistic graphical model to represent the conditional dependencies between individual pixels using a graphical format. In certain embodiments, the graph-cut partitioning system 106 utilizes a Conditional Random Fields model to predict a set of interrelated outputs (e.g., based on context and relationships between outputs) and model the spatial relationships between individual pixels, ensuring that neighboring pixels have consistent labels. For example, the graph-cut partitioning system 106 utilizes the Conditional Random Fields model to refine the initial segmentation by considering the spatial relationships between individual pixels and the image's features to generate a segmentation mask (where each individual pixel has a score indicating its likelihood of being in the foreground).

Figure 4A:
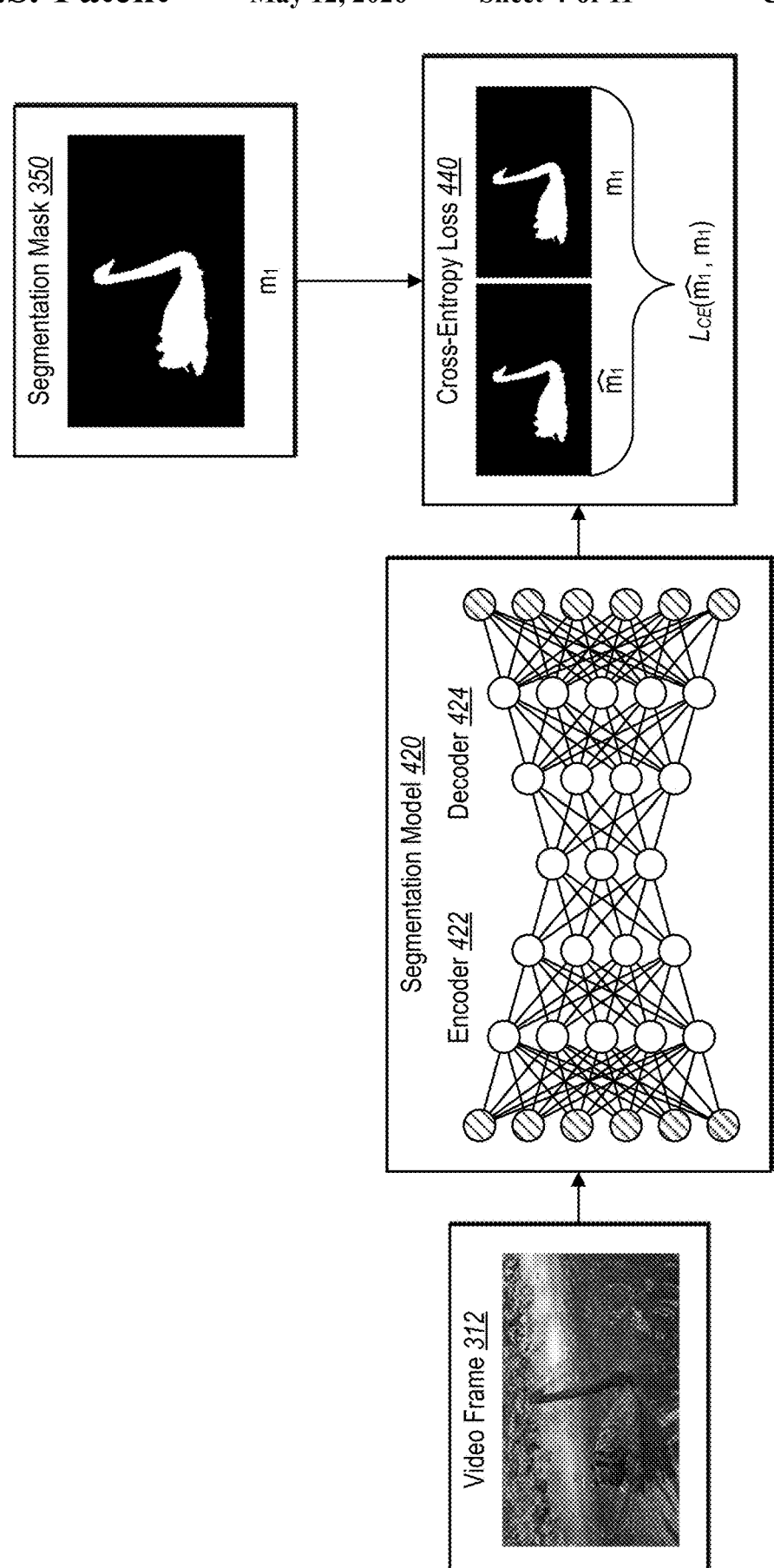
FIG. 4A illustrates an example of an initial training iteration of a segmentation model using a segmentation mask from a graph-cut process as a pseudo-ground truth in accordance with one or more embodiments.
Figure 4B:
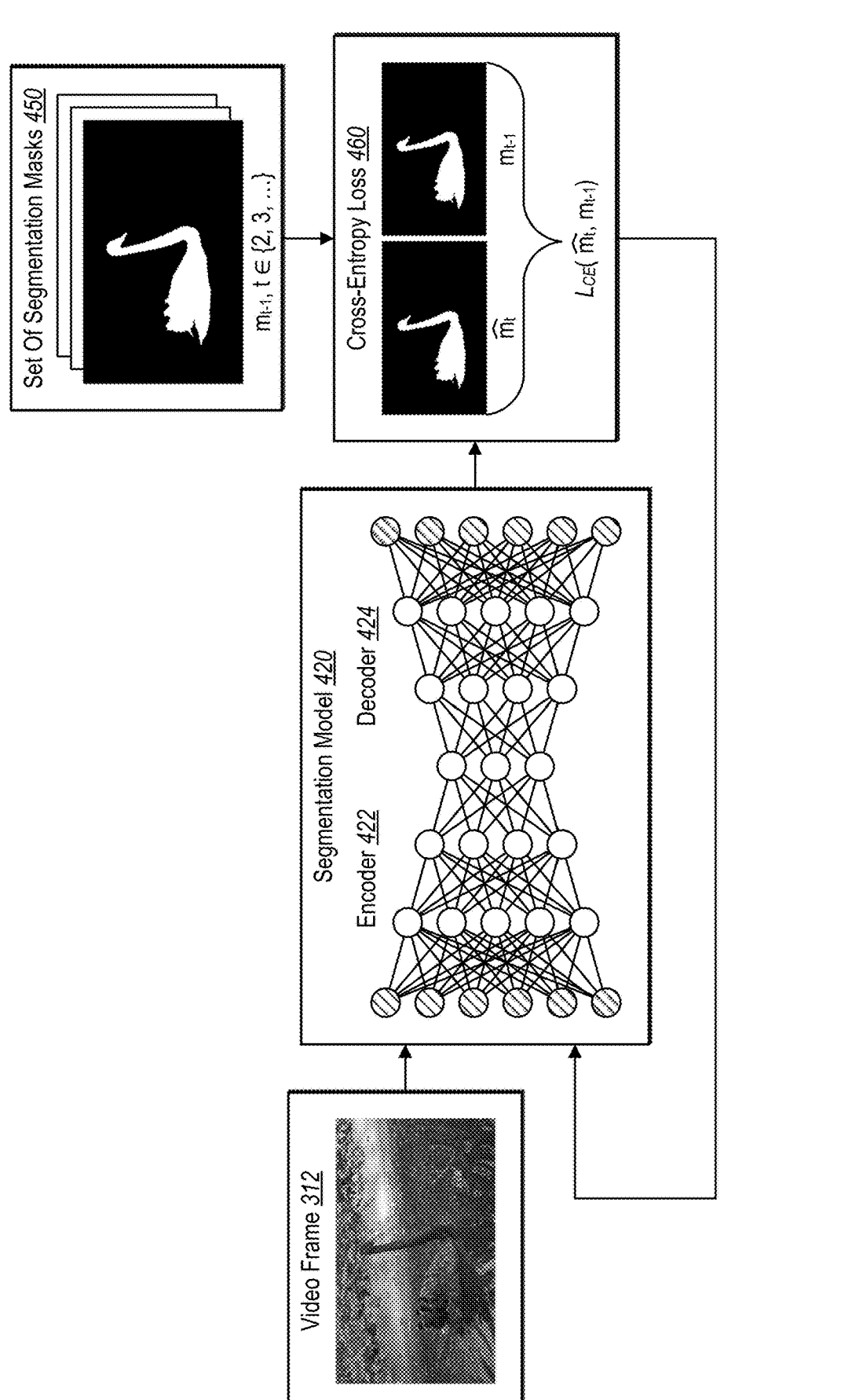
FIG. 4B illustrates an example of an iterative training process for a segmentation model using generated segmentation masks as pseudo-ground truths in accordance with one or more embodiments.

In one or more embodiments, the graph-cut partitioning system 106 utilizes the segmentation mask 350 as a ground truth to train a segmentation model. FIG. 4A-4B illustrate an example of training a segmentation model in accordance with one or more embodiments. As shown in FIG. 4A, the graph-cut partitioning system 106 uses the segmentation mask 350 as a pseudo-ground-truth of an initial training iteration of a segmentation model 420. Further, the graph-cut partitioning system 106 trains the segmentation model 420 to predict labels for each pixel in a digital image, and uses the predictions for comparison to the ground truth labels to compute the cross-entropy loss 440 and update the segmentation model 420.

To illustrate, the graph-cut partitioning system 106 performs an initial training iteration of the segmentation model 420 as shown in FIG. 4A. In particular, the graph-cut partitioning system 106 initializes the segmentation model 420 as $g_\theta : \mathbb{R}^{H \times W \times 3} \rightarrow \mathbb{R}^{H \times W \times 1}$, parameterized with weights θ. As shown, the graph-cut partitioning system 106 receives the input of a digital image (e.g., the video frame 312 of FIG. 3). The graph-cut partitioning system 106 utilizes a pre-trained encoder 422 with fixed parameters (e.g., a pre-trained vision transformer encoder) in conjunction with the decoder 424 to determine a segmentation mask $\widehat{m_1}$. In addition, the segmentation model 420 minimizes a cross-entropy loss $\mathcal{L}_{CE}$ based on a comparison of the segmentation mask $\widehat{m_1}$ to the segmentation mask $m_1$ (e.g., segmentation mask 350). Given N video frames (e.g., video frame 312), $x_i \in \mathbb{R}^{H \times W \times 3}$, with corresponding graph-cut masks $m_i \in \mathbb{R}^{H \times W \times 1}$, the graph-cut partitioning system 106 minimizes the binary cross-entropy loss $\mathcal{L}_{CE}$ in the $$\theta_1^* = \arg_{\theta_1} \min \frac{1}{N} \sum_{i=1}^{N} \mathcal{L}_{CE}(m_i, g_{\theta_t}(x_i))$$

In one or more embodiments, through incorporating this initial round of training shown in FIG. 4A, the graph-cut partitioning system 106 improves the quality of generated segmentation masks, especially at the boundaries. Specifically, the graph-cut partitioning system 106 improves performance of the segmentation model 420 by using the graph-cut process to generate one or more pseudo-ground truths.

As mentioned, the graph-cut partitioning system 106 iteratively trains the segmentation model 420 based on the segmentation model outputs via a bootstrapped, self-training process. FIG. 4B illustrates an example of an iterative training process for the segmentation model 420 using the generated segmentation masks as pseudo-ground truths in accordance with one or more embodiments.

In particular, after the initial round of training the segmentation model 420, the graph-cut partitioning system 106 determines an initial set of segmentation masks 450 for all the images in the training set using $g_{\theta_1,*}$ (e.g., by applying the segmentation model 420 after the initial round of training to the digital video 310 or to a separate image/video dataset). The graph-cut partitioning system 106 also uses the initial set of segmentation masks 450 as pseudo-ground-truths for training the segmentation model 420 from scratch utilizing the input of the video frame 312. The graph-cut partitioning system 106 continues this process iteratively for multiple rounds, thus bootstrapping $g_\theta$ by training on its own outputs as pseudo-ground-truths (e.g., bootstrapped self-training). For the iterative rounds of training, the graph-cut partitioning system 106 utilizes the pre-trained encoder 422 with modifiable parameters in conjunction with the decoder 424. Specifically, the graph-cut partitioning system 106 modifies the parameters of the pre-trained encoder 422 and/or decoder 424 to minimize a cross-entropy loss $\mathcal{L}_{CE}$ (e.g., cross-entropy loss 460) based on a comparison of the segmentation mask $\widehat{m_t}$ to the segmentation mask $m_{t-1}$. The graph-cut partitioning system 106 optimizes the cross-entropy loss $\mathcal{L}_{CE}$ for each iterative round of training denoted by time steps $t \in \{2, 3, \dots \}$, using the objective function:

15 16

$$\theta_t^* = \arg_{\theta_t} \min \frac{1}{N} \sum_{i=1}^{N} \mathcal{L}_{CE}\left(g_{\theta_{t-1}^*}(x_i), g_{\theta_t}(x_i)\right).$$

| | DAVIS16 (J ↑) | STv2 (J ↑) | FBMS59 (J ↑) |
|---|---|---|---|
| Unsupervised Graph-Cut Partitioning System 106 | 78.03 | 75.22 | 63.61 |
| Supervised Model | 76.76 | 76.27 | 63.64 |

Utilizing this method, the graph-cut partitioning system 106 causes the segmentation model 420 to correct its own mistakes over multiple rounds based on a specified number of rounds or until it saturates. Furthermore, unlike many conventional systems, the graph-cut partitioning system 106 trains the segmentation model 420 on a fixed dataset in each round of self-training. In addition, the graph-cut partitioning system 106 avoids overfitting by training $g_\theta$ from scratch rather than initializing from the checkpoint of a previous training round.

As mentioned, the graph-cut partitioning system 106 produces high-quality object segmentation masks in a self-supervised object discovery approach. FIG. 5 illustrates an example of a segmentation mask generated by the graph-cut partitioning system in accordance with one or more embodiments.

In particular, at the time of inference as shown in FIG. 5, the trained segmentation model 420 takes a single digital image 510 as input to generate the segmentation mask 520. Unlike existing video object segmentation systems, the graph-cut partitioning system 106 does not require additional inputs (e.g., optical flow) at the time of inference to generate the segmentation mask 520 from a digital image 510. Furthermore, the graph-cut partitioning system 106 does not require any test-time adaptations or post-processing techniques to render the segmentation mask 520. Notably, as mentioned above, the graph-cut partitioning system 106 utilizes the same trained segmentation model 420 to produce segmentation masks for digital video inputs. Indeed, the trained segmentation model 420 is modality-agnostic and the graph-cut partitioning system utilizes the same trained segmentation model to generate segmentation masks for both digital video and digital image inputs.

As shown in Table 1 below, the unsupervised optical flow guided graph-cut approach shown in FIG. 3 performs comparably well to a supervised alternative on standard datasets DAVIS 16, STv2, and FMBS59. The DAVIS16 benchmark is described by Federico Perazzi, Jordi Pont-Tuset, Brian McWilliams, Luc Van Gool, Markus Gross, and Alexander Sorkine-Hornung in "A benchmark dataset and evaluation methodology for video object segmentation," in Proceedings of the IEEE conference on computer vision and pattern recognition, pages 724-732, 2016. The Seg-Trackv2 (STv2) benchmark is described by Fuxin Li, Taeyoung Kim, Ahmad Humayun, David Tsai, and James M Rehg in "Video segmentation by tracking many figure-ground segments," in Proceedings of the IEEE international conference on computer vision, pages 2192-2199, 2013. The FBMS59 benchmark is described by Peter Ochs, Jitendra Malik, and Thomas Brox. Segmentation of moving objects by long term video analysis in "IEEE transactions on pattern analysis and machine intelligence," 36(6):1187-1200, 2013. For the analysis of the video object segmentation, Table 1 below utilizes the Jaccard metric, where $J$ is the mean intersection-over-union (mIoU) of the predicted and the ground-truth segmentation masks.

As shown in Table 1, the unsupervised graph-cut partitioning system 106 performs better than its supervised alternative on DAVIS16 and fares comparably well on STv2 and FBMS59. Although, by implementing the steps as described in FIG. 3, the graph-cut partitioning system 106 system is able to detect foreground objects extraordinarily well (e.g., see Table 1), in some embodiments, the segmentation mask 350 utilizes a segmentation model to improve segmentation masks when identifying small objects or segmenting multiple disconnected foreground objects. In particular, in certain implementations, the graph-cut partitioning system 106 distills information from the segmentation mask 350 to train a segmentation model as described in FIGS. 4A-4B to provide more robust object discovery and improved segmentation mask generation.

As also mentioned, the graph-cut partitioning system 106 provides improvements when generating segmentation masks over the current state-of-the-art segmentation models. For example, FIG. 6 illustrates a comparison of qualitative examples of segmentation masks generated from video frames of digital videos by the graph-cut partitioning system in accordance with one or more embodiments. In addition, FIG. 7 illustrates qualitative examples of segmentation masks generated from digital images by the graph-cut partitioning system in accordance with one or more embodiments.

For the comparisons shown in FIGS. 6-7, the graph-cut partitioning system 106 uses the model discussed above, ARFlow, for determining optical flow which is trained in a completely unsupervised fashion on the synthetic Sintel dataset. Furthermore, the initial segmentation masks are generated using a DINO ViT-B/8 encoder architecture for image and flow featurization (e.g., neural network encoder 320), as described by Mathilde Caron, Hugo Touvron, Ishan Misra, Herv. J.gou, Julien Mairal, Piotr Bojanowski, and Armand Joulin in "Emerging properties in self-supervised vision transformers," in Proceedings of the IEEE/CVF International Conference on Computer Vision, pages 9650-9660, 2021.

In addition, for the comparisons discussed below with regard to FIGS. 6-7, the input images are interpolated to a resolution of 256×512 (using bi-cubic interpolation), before being evaluated by the graph-cut partitioning system 106. As mentioned, at the time of inference, the graph-cut partitioning system 106 utilizes a segmentation model with only a single digital image as input, does not use additional inputs (e.g., optical flow), and does not employ any test-time adaptations or post-processing techniques.

| Method | Post-Processing | Inference RGB | Inference Flow | DAVIS16 $\mathcal{J}\uparrow$ | DAVIS16 $F\uparrow$ | STv2 $\mathcal{J}\uparrow$ | FBMS59 $\mathcal{J}\uparrow$ |
|---|---|---|---|---|---|---|---|
| SAGE | None | yes | yes | 42.6 | — | 57.6 | 61.2 |
| AMD | None | yes | no | 57.8 | — | 57.0 | 47.5 |
| TokenCut | CRF | yes | yes | 76.7 | — | 61.6 | 66.6 |
| CIS | CRF + SP | yes | yes | 71.5 | — | 62.0 | 63.5 |
| GWM | CRF + SP | yes | no | 80.7 | 86.9* | 78.9 | 78.4 |
| GRAPH-CUT PARTITIONING SYSTEM | None | yes | no | 80.9 | 88.7 | 79.9 | 68.8 |

Table 2 above illustrates a comparison of segmentation masks generated on standard video object segmentation (VOS) benchmarks DAVIS16, Seg-Trackv2 (STv2), and FMBS59. At the time of loss computation, the graph-cut partitioning system 106 interpolates the pseudo-ground-truths to 256×512 (using nearest interpolation) and employs the AdamW optimizer to optimize the weights of the segmentation network, $g_\theta$. The AdamW optimizer is taught by Ilya Loshchilov and Frank Hutter in "Decoupled weight decay regularization," in arXiv preprint arXiv:1711.05101, 2017. Moreover, the graph-cut partitioning system 106 trains the segmentation model until convergence (e.g., 25 k iterations).

As shown, the graph-cut partitioning system 106 is compared against unsupervised SAGE, AMD, and TokenCut methods. The SAGE model is described by WenguanWang, Jianbing Shen, Ruigang Yang, and Fatih Porikli in "Saliency-aware video object segmentation," in IEEE transactions on pattern analysis and machine intelligence, 40(1): 20-33, 2017. The AMD model is described by Runtao Liu, Zhirong Wu, Stella Yu, and Stephen Lin in "The emergence of objectness: Learning zero-shot segmentation from videos," in Advances in Neural Information Processing Systems, 34:13137-13152, 2021. The TokenCut method is described by Yangtao Wang, Xi Shen, Yuan Yuan, Yuming Du, Maomao Li, Shell Xu Hu, James L Crowley, and Dominique Vaufreydaz. Tokencut in "Segmenting objects in images and videos with self-supervised transformer and normalized cut," in arXiv preprint arXiv:2209.00383, 2022. Further, the embodiment of FIG. 6 is compared against supervised CIS and GWN methods. The CIS method is described by Yanchao Yang, Antonio Loquercio, Davide Scaramuzza, and Stefano Soatto in "Unsupervised moving object detection via contextual information separation," in Proceedings of the IEEE/CVF Conference on Computer Vision and Pattern Recognition, pages 879-888, 2019. The GWN method is described by Subhabrata Choudhury, Laurynas Karazija, Iro Laina, Andrea Vedaldi, and Christian Rupprecht in "Guess what moves: Unsupervised video and image segmentation by anticipating motion," in arXiv preprint arXiv:2205.07844, 2022.

In particular, Table 2 shows the results of using the graph-cut partitioning system 106 on images resized to a resolution of 480×848 for the DAVIS16 and STv2 datasets, and 480×640 for the FBMS59 dataset before passing through the DINO encoder (based on the dominant aspect ratio of the dataset). The comparison of the graph-cut partitioning system 106 in Table 2 is based on the Jaccard metric $\mathcal{J}$, where $\mathcal{J}$ is the mean intersection-over-union (mIoU) of the predicted and the ground-truth segmentation masks. For image segmentation tasks, the accuracy and max $F_\beta$ scores are shown, where $$F_\beta = \frac{(1 + \beta^2)\text{precision} \cdot \text{recall}}{\beta^2 \cdot \text{precision} \cdot \text{recall}}$$

with $\beta^2$=0.3. As shown in Table 2, the graph-cut partitioning system 106 is compared using the sequence average of mIoU scores on DAVIS16, frame average for STv2 and FBMS59 datasets.

As shown in Table 2, the graph-cut partitioning system 106 performs well when compared against state-of-the art systems, including systems that require supervision or post-processing. For example, the graph-cut partitioning system 106, which requires no post-processing, is compared against systems that require post-processing. In particular, the post-processing requirements for the systems include None, CRF or SP (e.g., Significant Post-processing techniques like multi-step flow, multi-crop ensemble, and temporal smoothing.) In terms of supervision, SAGE, CUT, TokenCut, and the graph-cut partitioning system 106 are unsupervised methods while CIS and GWN are supervised methods. As listed, inference indicates the inputs at the time of inference; namely optical flow and/or an RGB image. As shown, the graph-cut partitioning system 106 achieves or surpasses the conventional systems on the DAVIS16 and SegTrackv2 benchmarks and surpasses all but GWM (which requires supervision and significant post-processing) on the FBMS59 benchmarks.

Turning to FIG. 6. As shown in FIG. 6, the graph-cut partitioning system 106 qualitatively compares to a conventional supervised method on the DAVIS16, Seg-Trackv2, and FMBS59 benchmarks. When tested on an occluded object 610a, the GWN supervised method generates the segmentation mask 620a, and the graph-cut partitioning system 106 generates the segmentation mask 630a. The graph-cut partitioning system 106 provides a more accurate segmentation mask for this test, as shown by comparing the segmentation mask 620a and segmentation mask 630a against the ground truth segmentation mask 640a. When tested on an object in possible camouflage 610b, the GWN supervised method generates the segmentation mask 620b, and the graph-cut partitioning system 106 generates the segmentation mask 630b. The graph-cut partitioning system 106 provides a more accurate segmentation mask for this test, as shown by comparing the segmentation mask 620b and segmentation mask 630b against the ground truth segmentation mask 640b. When tested on complex background 610c, the GWN supervised method generates the segmentation mask 620c, the graph-cut partitioning system 106 generates the segmentation mask 630c. The graph-cut partitioning system 106 provides a more accurate segmentation mask for this test, as shown by comparing the segmentation mask 620c and segmentation mask 630c against the ground truth segmentation mask 640c.

As previously mentioned, in one or more embodiments, the graph-cut partitioning system 106 generates segmentation masks from digital images utilizing a segmentation model trained only on digital videos. FIG. 7 illustrates qualitative examples of segmentation masks generated from digital images by the graph-cut partitioning system in accordance with one or more embodiments.

As shown in Table 3, the graph-cut partitioning system 106 compares favorably with conventional systems when applied in a zero-shot manner on digital image segmentation benchmarks. In particular, the graph-cut partitioning system 106 performs well when evaluated on standard CUB, DUTS, and ECSSD datasets and compared with state-of-the art systems. The CUB dataset is described by Catherine Wah, Steve Branson, PeterWelinder, Pietro Perona, and Serge Belongie in "The caltech-ucsd birds-200-2011 dataset," 2011. The DUTS dataset is described by Lijun Wang, Huchuan Lu, Yifan Wang, Mengyang Feng, Dong Wang, Baocai Yin, and Xiang Ruan in "Learning to detect salient objects with image-level supervision," in Proceedings of the IEEE conference on computer vision and pattern recognition, pages 136-145, 2017. The ECSSD dataset is described by Jianping Shi, Qiong Yan, Li Xu, and Jiaya Jia in "Hierarchical image saliency detection on extended cssd," in IEEE transactions on pattern analysis and machine intelligence, 38(4):717-729, 2015.

cut partitioning system 106 includes, but is not limited to, an input manager 802, a segmentation mask manager 804, a segmentation model manager 806, and a data storage manager 808.

Figure 8:
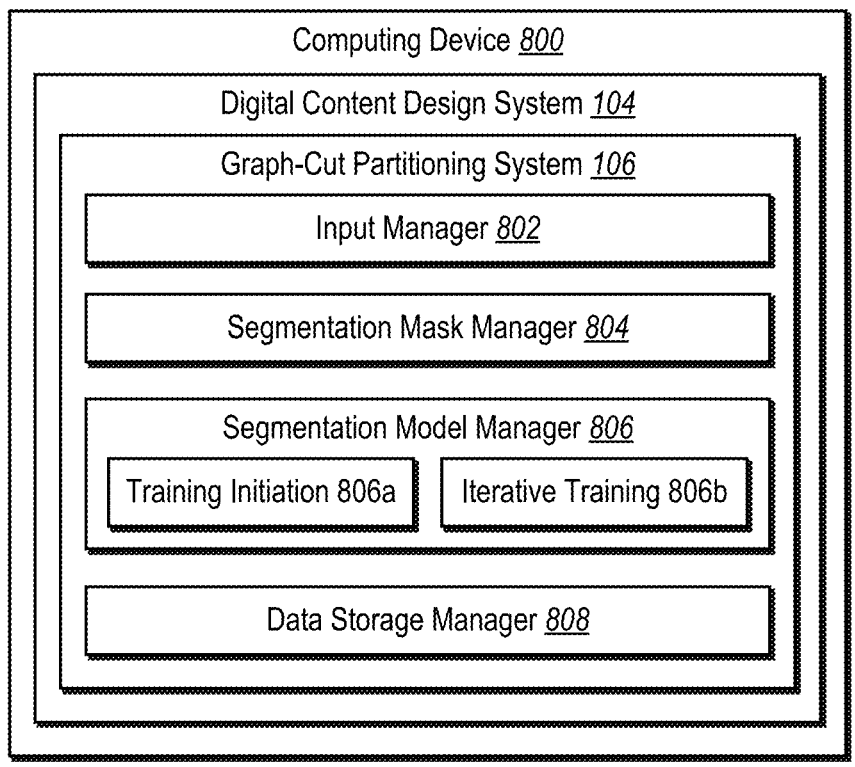
FIG. 8 illustrates a schematic diagram of a graph-cut partitioning system in accordance with one or more embodiments.

As just mentioned, and as illustrated in FIG. 8, the graph-cut partitioning system 106 includes the input manager 802. In one or more embodiments, the input manager 802 retrieves or determines an input comprising digital video and/or a digital image. As mentioned above, the input manager 802 manages utilizes digital video input and/or digital image input to generate a segmentation mask. Furthermore, the input manager 802 manages input that includes the segmentation masks for training a segmentation model.

Additionally, as shown in FIG. 8, the graph-cut partitioning system 106 includes the segmentation mask manager 804. The segmentation mask manager 804 combines optical flow patch features and image patch features to generate a segmentation mask from a digital video and delineate one or more salient objects within the digital video. In particular, in one or more implementations, the graph-cut partitioning system 106 utilizes the segmentation mask manager 804 to manage a neural network encoder to generate a segmentation mask utilizing a graph-cut process on a graph generating by leveraging optical flow patch features in combination with image patch features. For example, the segmentation

| Method | CUB | | | DUTS | | | ECSSD | | |
|---|---|---|---|---|---|---|---|---|---|
| | Acc ↑ | ℑ ↑ | maxF$_\beta$ | Acc ↑ | ℑ ↑ | maxF$_\beta$ | Acc ↑ | ℑ ↑ | maxF$_\beta$ |
| AMD | — | — | — | — | — | 60.2 | — | — | — |
| TokenCut | — | — | — | 91.4 | 62.4 | 75.5 | 93.4 | 77.2 | 87.4 |
| GWM | 93.5 | 64.6 | 80.9 | 91.5 | 49.2 | 65.6 | 88.5 | 56.1 | 74.3 |
| GRAPH-CUT PARTITIONING SYSTEM | 95.1 | 70.8 | 91.2 | 94.4 | 66.5 | 81.1 | 93.3 | 75.9 | 89.7 |

As further shown in FIG. 7, the graph-cut partitioning system 106 provides high-quality object segmentation masks on the CUB, DUTS, and ECSSD digital image datasets. In particular, the graph-cut partitioning system 106 provides high-quality object segmentation masks when applied in a zero-shot manner to digital images with complicated backgrounds, multiple foreground objects, possible camouflaged objects, and objects with fine textures and intricate boundaries. For example, when tested on the digital image of a bird 710a, the graph-cut partitioning system 106 generates the segmentation mask 720a which compares favorably visually to the ground truth segmentation mask 730a. As also shown, when tested on complicated digital image 710b, the graph-cut partitioning system 106 generates the segmentation mask 720b which compares favorably visually to the ground truth segmentation mask 730b. For example, when tested on the image of a wolf 710c, the graph-cut partitioning system 106 generates the segmentation mask 720c which compares favorably visually to the ground truth segmentation mask 730c.

Turning now to FIG. 8, additional detail will now be provided regarding various components and capabilities of the graph-cut partitioning system 106. In particular, FIG. 8 illustrates the graph-cut partitioning system 106 implemented by the computing device 800 (e.g., the server device(s) 102 and/or one of the client device(s) 110 discussed above with reference to FIG. 1). Additionally, the graph-cut partitioning system 106 is also part of the digital content design system 104. As shown in FIG. 8, the graph-mask manager 804 utilizes the neural network encoder to generate a fully connected graph based on image patches from the digital input, incorporating image patch feature and optical flow patch feature similarities to produce edge weights. The segmentation mask manager 804 utilizes a graph-cut method on the generated graph to produce a segmentation mask representing the foreground and background of the digital input.

As further shown in FIG. 8, the graph-cut partitioning system 106 includes the segmentation model manager 806. In particular, the segmentation model manager 806 incorporates the training initiation 806a and iterative training 806b. The graph-cut partitioning system 106 utilizes the segmentation model manager 806 to manage an initial training operation (e.g., training initiation 806a) on a segmentation model using the segmentation mask from the segmentation mask manager 804 as a pseudo-ground truth. Further, the graph-cut partitioning system 106 utilizes the segmentation model manager 806 to manage an iterative training operation (e.g., iterative training 806b) to iteratively train the segmentation model based on the segmentation model outputs via a bootstrapped, self-training process. In addition, the segmentation model manager 806 manages the segmentation model to predict labels for each pixel, and segmentation model manager 806 predictions are compared to the ground truth labels to compute the cross-entropy loss and update the segmentation model.

Additionally, as shown, the graph-cut partitioning system 106 includes data storage manager 808. In particular, data storage manager 808 (implemented by one or more memory devices) stores the digital content used by the graph-cut partitioning system 106 including the digital input, neural networks, segmentation models, labels, and segmentation masks. The data storage manager 808 facilitates the creation of segmentation masks by the graph-cut partitioning system 106.

Each of the components 802-808 of the graph-cut partitioning system 106 includes software, hardware, or both. For example, the components 802-808 include one or more instructions stored on a computer-readable storage medium and executable by processors of one or more computing devices, such as a client device or server device. When executed by the one or more processors, the computer-executable instructions of the graph-cut partitioning system 106 causes the computing device(s) to perform the methods described herein. Alternatively, the components 802-808 include hardware, such as a special-purpose processing device to perform a certain function or group of functions. Alternatively, the components 802-808 of the graph-cut partitioning system 106 include a combination of computer-executable instructions and hardware.

Furthermore, the components 802-808 of the graph-cut partitioning system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 of the graph-cut partitioning system 106 may be implemented as a stand-alone application, such as a desktop or mobile application. Furthermore, the components 802-808 of the graph-cut partitioning system 106 may be implemented as one or more web-based applications hosted on a remote server. Alternatively, or additionally, the components 802-808 of the graph-cut partitioning system 106 may be implemented in a suite of mobile device applications or "apps." For example, in one or more embodiments, the graph-cut partitioning system 106 comprises or operates in connection with digital software applications such as: ADOBE® PHOTOSHOP, ADOBE® PHOTOSHOP ELEMENTS, ADOBE® ILLUSTRATOR, ADOBE® PHOTOSHOP CAMERA, ADOBE® ANIMATE, ADOBE® PHOTOSHOP EXPRESS, ADOBE® PREMIERE ELEMENTS, ADOBE® PREMIERE RUSH, ADOBE® STOCK, ADOBE® CREATIVE CLOUD, or ADOBE® SENSEI. The foregoing are either registered trademarks or trademarks of Adobe Inc. in the United States and/or other countries.

FIGS. 1-8, the corresponding text, and the examples provide a number of different methods, systems, devices, and non-transitory computer-readable media of the graph-cut partitioning system 106. In addition to the foregoing, one or more embodiments are also described in terms of flow-charts comprising acts for accomplishing a particular result, as shown in FIG. 9. The acts shown in FIG. 9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium comprises instructions that, when executed by one or more processors, cause a computing device to perform the acts of FIG. 9. In some embodiments, a system is configured to perform the acts of FIG. 9. Alternatively, the acts of FIG. 9 are performed as part of a computer-implemented method.

FIG. 9 illustrates a flowchart of a series of acts 900 for of using a graph-cut partitioning system 106 to generate a segmentation mask in accordance with one or more embodiments. While FIG. 9 illustrates acts according to one embodiment, alternative embodiments may omit, add to, reorder, and/or modify any acts shown in FIG. 9.

FIG. 9 illustrates an example series of acts 900 for utilizing a graph-cut partitioning system 106 to generate a segmentation mask. In particular, the series of acts 900 includes an act 902 of determining, for a digital video, optical flow patch features of visual elements corresponding to a plurality of image patches from a video frame of the digital video. Specifically, the act 902 includes determining, for a digital video, optical flow patch features indicating a distribution of velocities of visual elements corresponding to a plurality of image patches from a video frame of the digital video. As illustrated, the series of acts 900 also includes an act 904 of determining image patch features corresponding to the plurality of image patches from the video frame of the digital video. Specifically, the act 904 includes determining, utilizing a neural network encoder, image patch features corresponding to the plurality of image patches from the video frame of the digital video.

As illustrated, the series of acts 900 also includes an act 906 of generating a bi-partitioned graph. For example, act 906 includes act 906a of generating a plurality of nodes corresponding to the plurality of image patches. Act 906 also includes act 906b of generating edges between the plurality of nodes with corresponding edge weights based on a similarity measure between the plurality of nodes. Specifically, the act 906 includes generating a bi-partitioned graph comprising a plurality of nodes corresponding to the plurality of image patches and edges between the plurality of nodes with corresponding edge weights based on a similarity measure between the plurality of nodes determined using a linear combination of the optical flow patch features and the image patch features. As illustrated, the series of acts 900 also includes an act 908 of generating labels for the digital video indicating a foreground region and a background region from a segmentation mask based on the bi-partitioned graph. Specifically, the act 906 includes generating, for storage on one or more memory devices, labels for the digital video indicating a foreground region and a background region from a segmentation mask based on the bi-partitioned graph.

In addition (or in the alternative) to the acts described above, the graph-cut partitioning system series of acts 900 includes determining, from a digital image, optical flow patch features representing a movement of visual elements corresponding to a plurality of image patches extracted from the digital image. The series of acts 900 also includes determining, utilizing a neural network encoder, image patch features corresponding to the plurality of image patches extracted from the digital image. Moreover, in one or more embodiments, the graph-cut partitioning system 106 series of acts 900 includes generating a segmentation mask comprising a foreground region and a background region of the digital image based on bi-partitioned graph determined from a combination of the optical flow patch features and the image patch features.

Further still, in some embodiments, the graph-cut partitioning system 106 series of acts 900 includes generating a plurality of nodes based on the plurality of image patches and edges between the plurality of nodes. Furthermore, in one or more embodiments, the graph-cut partitioning system series of acts 900 includes determining edge weights corresponding to the edges based on a linear combination of the optical flow patch features and the image patch features. In addition, in one or more embodiments, the graph-cut partitioning system 106 series of acts 900 includes generating the bi-partitioned graph comprising the plurality of nodes partitioned based on the edge weights.

Further still, in some embodiments, the graph-cut partitioning system 106 series of acts 900 includes partitioning the plurality of nodes based on a cosine similarity of the optical flow patch features and a cosine similarity of the image patch features. Furthermore, in one or more embodiments, the graph-cut partitioning system series of acts 900 includes generating the bi-partitioned graph by determining a similarity measure for the optical flow patch features and the image patch features using a linear combination. Moreover, in one or more embodiments, the series of acts 900 includes converting the similarity measure into a binary similarity measure by normalizing the similarity measure utilizing a threshold similarity edge weight hyper-parameter. Additionally, in one or more embodiments, the graph-cut partitioning system series of acts 900 includes generating the segmentation mask based on a post-processing step utilizing a probabilistic graphical model to determine a binary segmentation based on individual pixels within the plurality of image patches.

Moreover, in one or more embodiments, the series of acts 900 includes generating, utilizing a segmentation model comprising a segmentation encoder neural network and a segmentation decoder neural network, an initial segmentation mask from the digital image. Further still, in one or more embodiments, the series of acts 900 includes updating initial parameters of the segmentation decoder neural network of the segmentation model with fixed parameters for the segmentation encoder neural network based on a difference between the segmentation mask and the initial segmentation mask. In addition, in one or more embodiments, the graph-cut partitioning system series of acts 900 includes, in response to updating the initial parameters of the segmentation decoder neural network of the segmentation model, iteratively generating pseudo-ground-truth segmentation masks utilizing the segmentation model and modifying parameters of the segmentation model based on the pseudo-ground-truth segmentation masks. Moreover, in one or more embodiments, the series of acts 900 includes generating, utilizing the segmentation model with the modified parameters, an additional segmentation mask comprising an additional foreground region and an additional background region of an additional digital image.

Further still, in one or more embodiments, the series of acts 900 includes determining, utilizing the neural network encoder, the optical flow patch features from optical flow values in a color space. Additionally, in one or more embodiments, the series of acts 900 includes generating, for storage on one or more memory devices, labels for the digital image indicating the foreground region and the background region. Moreover, in one or more embodiments, the series of acts 900 includes generating, utilizing a segmentation model comprising a segmentation encoder neural network and a segmentation decoder neural network, an initial segmentation mask from the video frame based on using the segmentation mask as a pseudo-ground truth. Further, in one or more embodiments, the series of acts 900 includes updating initial parameters of the segmentation decoder neural network of the segmentation model with fixed parameters for the segmentation encoder neural network based on a difference between the segmentation mask and the initial segmentation mask.

Moreover, in one or more embodiments, the series of acts 900 includes in response to updating the initial parameters of the segmentation decoder neural network of the segmentation model, iteratively generating pseudo-ground-truth segmentation masks utilizing the segmentation model and modifying parameters of the segmentation model based on the pseudo-ground-truth segmentation masks. Furthermore, in one or more embodiments, the series of acts 900 includes determining, utilizing the segmentation model, an object of an input digital image.

In addition, in one or more embodiments, the series of acts 900 includes generating a fully connected graph based on a linear combination of a cosine similarity of the optical flow patch features and a cosine similarity of the image patch features. Moreover, in one or more embodiments, the series of acts 900 includes converting the similarity measure into a binary similarity measure by normalizing the similarity measure. Furthermore, in one or more embodiments, the series of acts 900 includes generating the bi-partitioned graph by generating an adjacency matrix comprising the plurality of nodes and edge weights by incorporating motion signals corresponding to the optical flow patch features based on the similarity measure between the plurality of nodes determined using the linear combination of the optical flow patch features and the image patch features.

Moreover, in one or more embodiments, the series of acts 900 includes determining, for a digital video, optical flow patch features representing movement of visual elements corresponding to a plurality of image patches from a video frame of the digital video. Additionally, in one or more embodiments, the series of acts 900 includes determining, utilizing a neural network encoder, image patch features corresponding to the plurality of image patches from the video frame of the digital video. Further still, in one or more embodiments, the series of acts 900 includes generating a bi-partitioned graph comprising a plurality of nodes corresponding to the plurality of image patches and edges between the plurality of nodes with corresponding edge weights based on a similarity measure between the plurality of nodes. In addition, in one or more embodiments, the series of acts 900 includes generating a segmentation mask comprising a foreground region and a background region based on the bi-partitioned graph.

Furthermore, in one or more embodiments, the graph-cut partitioning system series of acts 900 includes generating the similarity measure between the plurality of nodes determined using a combination of the optical flow patch features and the image patch features. Moreover, in one or more embodiments, the series of acts 900 includes generating the segmentation mask based on a binary segmentation of the video frame by partitioning the video frame based on the edge weights.

Further still, in one or more embodiments, the series of acts 900 includes generating, utilizing a segmentation model comprising a segmentation encoder neural network and a segmentation decoder neural network, an initial segmentation mask from the video frame. Additionally, in one or more embodiments, the series of acts 900 includes updating initial parameters of the segmentation decoder neural network of the segmentation model with fixed parameters for the segmentation encoder neural network based on a difference between the segmentation mask and the initial segmentation mask. Moreover, in one or more embodiments, the series of acts 900 includes, in response to updating the initial parameters of the segmentation decoder neural network of the segmentation model, iteratively generating pseudo-ground-truth segmentation masks utilizing the segmentation model and modifying parameters of the segmentation model based on the pseudo-ground-truth segmentation masks. Further, in one or more embodiments, the series of acts 900 includes determining, utilizing the segmentation model, an object of an input digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
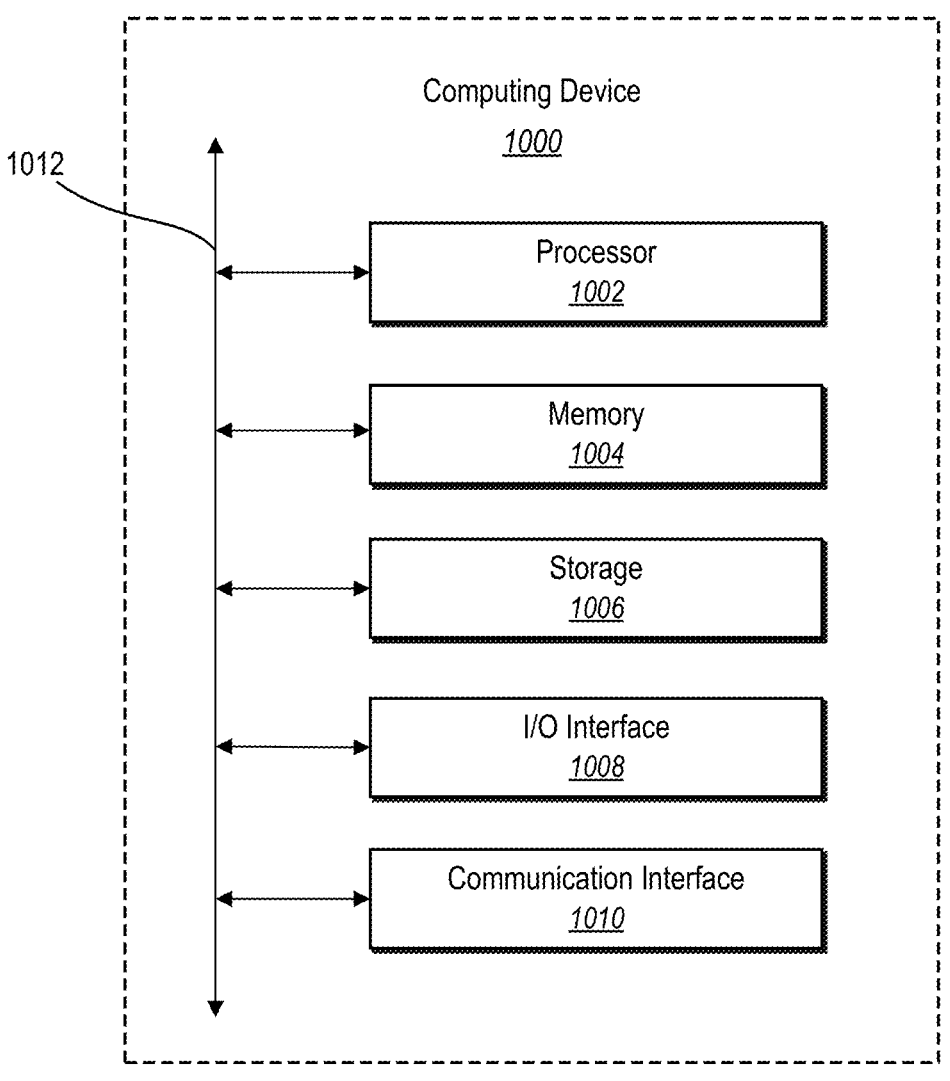
FIG. 10 illustrates a block diagram of an example computing device in accordance with one or more embodiments.

FIG. 10 illustrates a block diagram of an example computing device that may be configured to perform one or more of the processes described above. One will appreciate that one or more computing devices, such as the computing device 1000 may represent the computing devices described above (e.g., server device(s) 102, client device(s) 110, and computing device 1000). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, from a digital image, optical flow patch features representing a movement of visual elements corresponding to a plurality of image patches extracted from the digital image;

determining, utilizing a neural network encoder, image patch features corresponding to the plurality of image patches extracted from the digital image; and generating a segmentation mask comprising a foreground region and a background region of the digital image based on a bi-partitioned graph comprising edge weights determined from a weighted linear combination of the optical flow patch features and the image patch features, wherein the weighted linear combination comprises a linear combination coefficient that weights the optical flow patch features at a first weight and the image patch features at a second weight different from the first weight.

2. The computer-implemented method of claim 1, further comprising:

generating a plurality of nodes based on the plurality of image patches and edges between the plurality of nodes;

generating the bi-partitioned graph comprising the plurality of nodes partitioned based on the edge weights.

3. The computer-implemented method of claim 2, wherein generating the bi-partitioned graph comprises partitioning the plurality of nodes based on a cosine similarity of the optical flow patch features and a cosine similarity of the image patch features.

4. The computer-implemented method of claim 1, further comprising:

generating the bi-partitioned graph by determining a similarity measure for the optical flow patch features and the image patch features using the weighted linear combination; and converting the similarity measure into a binary similarity measure by normalizing the similarity measure utilizing a threshold similarity edge weight hyper-parameter.

5. The computer-implemented method of claim 1, wherein generating the segmentation mask comprises generating the segmentation mask based on a post-processing step utilizing a probabilistic graphical model to determine a binary segmentation based on individual pixels within the plurality of image patches.

6. The computer-implemented method of claim 1, further comprising:

generating, utilizing a segmentation model comprising a segmentation encoder neural network and a segmentation decoder neural network, an initial segmentation mask from the digital image; and updating initial parameters of the segmentation decoder neural network of the segmentation model with fixed parameters for the segmentation encoder neural network based on a difference between the segmentation mask and the initial segmentation mask.

7. The computer-implemented method of claim 6, further comprising, in response to updating the initial parameters of the segmentation decoder neural network of the segmentation model, iteratively generating pseudo-ground-truth segmentation masks utilizing the segmentation model and modifying parameters of the segmentation model based on the pseudo-ground-truth segmentation masks.

8. The computer-implemented method of claim 7, further comprising generating, utilizing the segmentation model with the modified parameters, an additional segmentation mask comprising an additional foreground region and an additional background region of an additional digital image.

9. The computer-implemented method of claim 1, further comprising determining, utilizing the neural network encoder, the optical flow patch features from optical flow values in a color space.

10. The computer-implemented method of claim 1, further comprising generating, for storage on one or more memory devices, labels for the digital image indicating the foreground region and the background region.

11. A system comprising:

one or more memory devices comprising a digital video; and one or more processors configured to cause the system to:

determine, for the digital video, optical flow patch features indicating a distribution of velocities of visual elements corresponding to a plurality of image patches from a video frame of the digital video;

determine, utilizing a neural network encoder, image patch features corresponding to the plurality of image patches from the video frame of the digital video;

generate a bi-partitioned graph comprising a plurality of nodes corresponding to the plurality of image patches and edges between the plurality of nodes with corresponding edge weights based on a similarity measure between the plurality of nodes determined using a weighted linear combination of the optical flow patch features and the image patch features, wherein the weighted linear combination comprises a linear combination coefficient that weights the optical flow patch features at a first weight and the image patch features at a second weight different from the first weight; and generate, for storage on one or more memory devices, labels for the digital video indicating a foreground region and a background region from a segmentation mask based on the bi-partitioned graph.

12. The system of claim 11, further comprising:

generating, utilizing a segmentation model comprising a segmentation encoder neural network and a segmentation decoder neural network, an initial segmentation mask from the video frame based on using the segmentation mask as a pseudo-ground truth; and updating initial parameters of the segmentation decoder neural network of the segmentation model with fixed parameters for the segmentation encoder neural network based on a difference between the segmentation mask and the initial segmentation mask.

13. The system of claim 12, further comprising further comprising, in response to updating the initial parameters of the segmentation decoder neural network of the segmentation model, iteratively generating a set of pseudo-ground-truth segmentation masks utilizing the segmentation model and modifying parameters of the segmentation model based on the set of pseudo-ground-truth segmentation masks.

14. The system of claim 13, further comprising determining, utilizing the segmentation model, an object of an input digital image.

15. The system of claim 11, wherein generating the bi-partitioned graph comprises generating a fully connected graph based on the weighted linear combination comprising a cosine similarity of the optical flow patch features and a cosine similarity of the image patch features; and converting the similarity measure into a binary similarity measure by normalizing the similarity measure.

16. The system of claim 11, further comprising generating the bi-partitioned graph by generating an adjacency matrix comprising the plurality of nodes and edge weights by incorporating motion signals corresponding to the optical flow patch features based on the similarity measure between the plurality of nodes determined using the weighted linear combination of the optical flow patch features and the image patch features.

17. A non-transitory computer readable medium storing executable instructions which, when executed by a processing device, cause the processing device to perform operations comprising:

determining, for a digital video, optical flow patch features representing movement of visual elements corresponding to a plurality of image patches from a video frame of the digital video;

determining, utilizing a neural network encoder, image patch features corresponding to the plurality of image patches from the video frame of the digital video;

generating a bi-partitioned graph comprising a plurality of nodes corresponding to the plurality of image patches and edges between the plurality of nodes with corresponding edge weights based on a similarity measure between the plurality of nodes, wherein the similarity measure comprises a linear combination coefficient that weights the optical flow patch features at a first weight and the image patch features at a second weight different from the first weight; and generating a segmentation mask comprising a foreground region and a background region based on the bi-partitioned graph.

18. The non-transitory computer readable medium of claim 17, further comprising generating the similarity measure between the plurality of nodes determined using the weighted linear combination comprising a cosine similarity of the optical flow patch features and a cosine similarity of the image patch features.

19. The non-transitory computer readable medium of claim 17, further comprising generating the segmentation mask based on a binary segmentation of the video frame by partitioning the video frame based on the corresponding edge weights.

20. The non-transitory computer readable medium of claim 17, further comprising:

generating, utilizing a segmentation model comprising a segmentation encoder neural network and a segmenta tion decoder neural network, an initial segmentation mask from the video frame;

updating initial parameters of the segmentation decoder neural network of the segmentation model with fixed parameters for the segmentation encoder neural network based on a difference between the segmentation mask and the initial segmentation mask;

in response to updating the initial parameters of the segmentation decoder neural network of the segmentation model, iteratively generating pseudo-ground-truth segmentation masks utilizing the segmentation model and modifying parameters of the segmentation model based on the pseudo-ground-truth segmentation masks; and determining, utilizing the segmentation model, an object of an input digital image.

* * * * *